United States Patent [19]
Kiuchi et al.

[11] 3,742,090
[45] June 26, 1973

[54] THERMOPLASTIC RESIN COMPOSITION CONTAINING AN ETHYLENE-VINYL ACETATE GRAFT COPOLYMER

[75] Inventors: Hiroshi Kiuchi; Keisuke Oshima; Takashi Nishidoi; Toshihiko Aya, all of Otsu, Shiga, Japan

[73] Assignee: Toray Industries, Inc., Tokyo, Japan

[22] Filed: May 7, 1969

[21] Appl. No.: 822,671

[30] Foreign Application Priority Data
May 9, 1968 Japan.................................. 43/30508

[52] U.S. Cl........... 260/876 R, 260/877, 260/878 R
[51] Int. Cl. ............................................. C08f 37/18
[58] Field of Search............................. 260/876, 878

[56] References Cited
UNITED STATES PATENTS
3,488,743  1/1970  Baer et al. ........................... 260/876
3,461,188  8/1969  Baer..................................... 260/876

Primary Examiner—Samuel H. Blech
Assistant Examiner—John Seibert
Attorney—Paul & Paul

[57] ABSTRACT

Weather- and impact-resistant resin copolymer composition consists of a mixture of 0.36 — 90 percent by weight of graft polymer (C) and 10 — 99.64 percent by weight of a resin component (D).

Resin component (D) is the polymer or copolymer resulting from polymerization of monomer mixture (A).

Graft polymer (C) is a copolymer of a monomer mixture (A) and trunk rubber component (B), the copolymerization percentage ratio by weight of A:B(degree of grafting)being 20 — 500 percent.

Monomer mixture (A) is selected from the group consisting of: aromatic vinyl compound, alkyl methacrylate wherein the alkyl group has one to three carbon atoms, and acrylonitrile.

Trunk rubber component (B) is an ethylene-vinyl acetate copolymer having a side chain which includes a $CH_2 = C(CH_3)COO-$ group.

19 Claims, 5 Drawing Figures

HIROSHI KIUCHI
KEISUKE OSHIMA
TAKASI NISHIDOI
TOSHIHIKO AYA 3,742,090

THERMOPLASTIC RESIN COMPOSITION CONTAINING AN ETHYLENE-VINYL ACETATE GRAFT COPOLYMER

The present invention relates to a thermoplastic resin composition having good surface smoothness and excellent weatherability and impact resistance, and to a process for the preparation thereof.

Heretofore various rubber modified impact resistant resins such as ABS resin or high impact polystyrene resin have been known, and various processes for the preparation thereof have been proposed. A representative process thereof is a so-called chain transfer-type graft polymerization process for polymerizing styrene or styrene and acrylonitrile in the presence of a rubbery polymer of the conjugated diolefin series, using a polymerization initiator of the peroxide series high in ability to withdraw hydrogen, thereby making a polymerization product having an interfacial affinity phase separation structure, which process is applied to the preparation of ABS resin or high impact polystyrene resin.

At this time, a process for the preparation of an elastomer modified polymer which comprises dissolving an elastomer in a vinyl compound monomer (or a mixture of monomers) and bulk polymerizing, emulsion polymerizing, suspension polymerizing or bulk-suspension polymerizing said monomer or a mixture of monomers, is known. Upon preparing an elastomer modified polymer by graft polymerizing styrene to a synthetic rubber of the conjugated diolefin series by bulk polymerization or suspension polymerization, it is known that it is effective to cause phase separation of an elastomer phase from a hard resin phase by partially bulk polymerizing the elastomer-monomer solution with stirring in order to impart useful impact resistance, excellent hardness, high tensile strength and good shaping processability to the polymer using a relatively small amount of the elastomer. However, that the elastomer phase and the hard resin take a phase separation is not a sufficient condition to impart effective impact resistance to the hard resin, and realization of a phase separation structure by mere blending to obtain effective impact resistance is rather exceptional which is seen only in case the solubility parameters of the two are relatively proximate, such as styrene-acrylonitrile copolymer and butadiene-acrylonitrile copolymer, for example. In general, the difference in solubility parameter between a hard resin and an elastomer is large; in such case, in order to obtain effective impact resistance, it is necessary to create a so-called surface affinity phase separation structure wherein, at the border surface of the phase separation structure, a block copolymer or graft copolymer is made to exist, in which both of the components constituting the hard resin phase and the elastomer phase are connected. Further, in order to impart better impact strength, the existing amount of this block copolymer or graft copolymer has a decisive significance.

A resin so obtained by chain transfer-type graft polymerization using a rubbery polymer of the conjugated diolefin series is very excellent in impact resistance. However, because such resin contains essentially an unsaturated double bond due to the presence of said rubbery polymer, it has hardly any weather resistance and suffers deterioration due to oxygen, ozone and ultraviolet ray degration.

Therefore, recently in order to improve the weather resistance of polymers of this kind, a process for graft polymerizing various vinyl monomers using an essentially saturated rubbery polymer, for instance, a rubbery material of an ethylene-propylene copolymer has been proposed. As a polymerization process in this case, the process comprises oxidizing the rubbery polymer to produce a peroxide bond and reacting this bond with a monomer constituting the resin component. Another such process involves using a polymerization initiator having a large capacity of withdrawing hydrogen and reacting the resulting rubbery polymer with a monomer selected to provide the resin component. However, in such case, because the rubbery polymer is essentially saturated, only a few graft activated points exist and, because the amount of monomer grafting to the rubbery polymer is very small, affinity of the rubbery material with the resinous material is generally very low and it is not possible to form a proper interfacial affinity phase separation structure. Accordingly an impact resistant resin cannot be obtained which can be offered for practical use.

In order to overcome these difficulties, a process is provided for preparing an impact resistant resin wherein a rubber phase is dispersed within the range of particle diameters of $0.5 - 10\mu$ (microns), which comprises polymerizing styrene and methyl methacrylate to a polymerization degree of about 5 - 30 percent using a high temperature decomposition type peroxide having a high cross-linking property for polymer in the presence of an ethylene-vinyl acetate copolymer containing a large amount of vinyl acetate wherein as a part of the side chain $CH_2 = CHCOO-$ is introduced in an amount of about 0.1 - 0.3 percent by weight of the main chain (below 0.04 millimole based on 1 g of weight of the main chain) to transfer the rubber phase from a continuous phase to a dispersed phase, thereafter cross-linking the rubber phase and, at the same time, completing the polymerization. However, by these processes, it is not necessarily possible to form an interfacial affinity phase separation structure, and even if the interfacial affinity phase separation structure is realized, it is not necessarily possible to obtain a polymer having good impact resistance.

As a result of variously investigating and studying the reason therefor, it has now been found that in order to impart impact resistance, an introducing amount of said unsaturated group and the shape of rubber particles become important factors. Further, it has been noted that a shaped article having good surface condition is not necessarily obtained by following the prior art, but the surface of the shaped article becomes rough and the smoothness of the surface becomes poor. A phenomenon similar to frosted glass takes place and the luster of the surface is lost in many cases. It has been found that this difficulty can be overcome by controlling the particle diameters of the rubber. From the foregoing results, it has been found that a polymer composition consisting of a resin obtained by graft polymerizing styrene or methyl methacrylate using an activated $\alpha$-olefin-vinyl ester copolymer into which $CH_2=CHCOO-$ group or $CH_2=C(CH_3)COO-$ group is introduced in an amount of 0.05 –1.0 mol percent of the bonding unit of the main chain, in said resin an average particle diameter of grafted rubber component being 0.05 - 0.5 micron and the shape of said rubber being characterized in that it is a film, the outer layer of rubber polymer wholly surrounding an inner core of hard resin, or an aggregate of such spherical films in which resin components are filled, is excellent in impact resistance and surface smoothness, having proposed the same earlier. In this case, in order to have the rubber phase take such a shape the amount of the double bond introduced into the side chain of rubber, the activating condition for introducing the double bond into the rubber and the polymerization conditions are important. An ethylene-vinyl acetate copolymer used as a rubber phase is known to become inexpensive as the vinyl acetate content decreases, which is commercially advantageous. However, because the rubbery property gradually deteriorates, heretofore said copolymer has hardly been examined and as a known example, there has been only one instance of using an ethylene-vinyl acetate copolymer whose vinyl acetate content was 45 percent by weight.

A detailed study has been conducted using a polymer composition in the form of an ethylene-vinyl acetate copolymer whose vinyl acetate content was not more than 30 percent. As a result we found a surprising fact that by applying very special polymerization conditions, a composition having the internal composition of the present invention is attained, by using an ethylene-vinyl acetate copolymer whose vinyl acetate content is as small as below 20 percent by weight, having poor rubbery property, it becomes possible to increase the ethylene-vinyl acetate copolymer (namely, content of a rubber component) in the polymer composition more easily than in the case of using an ethylene-vinyl acetate copolymer having a higher vinyl acetate content. Accordingly, a polymer composition having a higher impact resistance is obtained. Moreover, the shape of the rubber phase does not necessarily have to assume the form of a spherical film or an aggregate of spherical films, thus having reached the present invention.

Accordingly, the present invention relates to a thermoplastic resin composition which is excellent in weather resistance and impact resistance.

The invention also relates to a process for making such a polymer composition or mixture.

Figure 1:
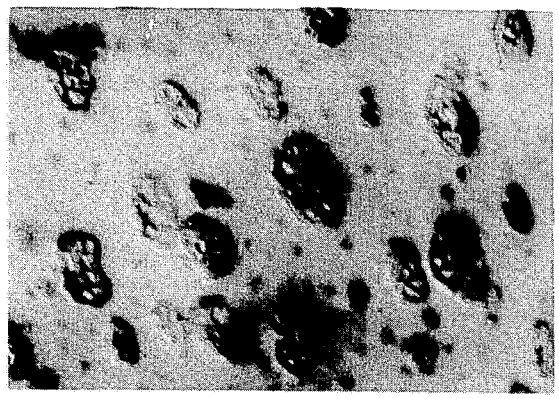
FIG. 1 shows an electron microscope photograph of a cut piece of a shaped article of a resin in accordance with the present invention.

An aromatic vinyl compound as referred to in the present invention is a styrene derivative represented by the general formula

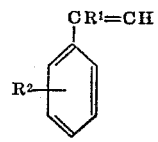

(wherein $R^1$ and $R^2$ stand for hydrogen, methyl group or a halogen atom); specific examples include styrene, α-methyl styrene, p-methyl styrene and p-chlorostyrene. As specific examples of alkyl methacrylate (wherein the alkyl group has one to three carbon atoms), for instance, methyl methacrylate, ethyl methacrylate, n-propyl methacrylate and isopropyl methacrylate may be cited. Also in the present invention, so long as the content is not more than 30 percent by weight of said monomer mixture (A), a vinyl compound monomer represented by the general formula $$CH_2 = C(CH_3)COOR$$

(wherein R stands for an alkyl group having four to eight carbon atoms) such as butyl methacrylate, and hexyl methacrylate; alkyl acrylate represented by the general formula $$CH_2 = CHCOOR$$

(wherein R stands for an alkyl group having one to eight carbon atoms) such as, for instance, methyl acrylate, n-butyl acrylate and ethyl acrylate; methacrylonitrile; and other vinyl compound monomers which are copolymerizable with said aromatic vinyl compound or said alkyl methacrylate wherein alkyl group has one to three carbon atoms may be used, respectively as the occasion demands.

An ethylene-vinyl acetate copolymer before activation used in the present invention (namely, an ethylene-vinyl acetate copolymer before the $CH_2 = C(CH_3)COO-$ group is introduced into the side chain) is a copolymer obtained by radical polymerizing of 5–30 percent by weight, preferably 7–25 percent by weight of vinyl acetate with ethylene. Insofar as the content of vinyl acetate is within said range, it goes without saying that it is possible to copolymerize a copolymeric component properly without adversely affecting the polymer characteristics. In this case, the amount of any other copolymeric component that is used is preferably selected within the range where the ethylene content comprises not less than 70 percent by weight of all of the monomers. Specific examples of said other copolymeric component include, for instance, a vinyl ester of an aliphatic carboxylic acid having one to five carbon atoms, vinyl esters of an aromatic carboxylic acid having seven to 10 carbon atoms, such as vinyl formate, vinyl propionate, vinyl benzoate and vinyl p-methyl benzoate, vinyl alcohol (which can be introduced by hydrolysis of vinyl ester containing in the copolymer), acrylic acid, methacrylic acid and their alkyl esters (wherein the alkyl group has one to eight carbon atoms).

The composition of the present invention is obtained, for instance, by the following method. Namely, as a first step to a part of the side chain of an ethylene-vinyl acetate copolymer after activation, namely, after the $CH_2=C(CH_3)COO-$ group is introduced thereto, a methacrylic acid group having good radical copolymerizability with an aromatic vinyl compound, alkyl methacrylate (wherein alkyl group has one to three carbon atoms) and acrylonitrile in an amount of 0.04 – 0.25 millimole (preferably 0.05 – 0.20 millimole) based on the unit weight in gram is introduced. A method of introducing a methacrylic acid group will be mentioned later; however, one of the specific examples is as follows. At first, as a first step, an ethylene-vinyl acetate copolymer ("Evaflex" No. 460 containing 19 percent by weight of vinyl acetate manufactured by Mitsui Polychemical Co., Ltd.) is dissolved in a styrene-methyl methacrylate mixed solvent to carry out an ester interchange reaction between a vinyl acetate group and methyl methacrylate using sodium methoxide as a catalyst to introduce as a part of the side chain

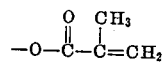

to obtain a styrene-methyl methacrylate solution of a graft activated ethylene-vinyl acetate copolymer (at this time the introduced amount of

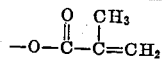

group is made 0.04–0.25 millimole based on the unit weight in gram of the graft activated ethylene-vinyl acetate copolymer). Hereinafter an ethylene-vinyl acetate copolymer to whose side chain $CH_2 = C(CH_3)COO-$ group is introduced will be referred to as an activated ethylene-vinyl acetate copolymer. As a second step to a styrene-methyl methacrylate solution of said activated ethylene-vinyl acetate copolymer, styrene and acrylonitrile and another polymerizable vinyl compound, if necessary, are added to make the ratio of the activated ethylene-vinyl acetate copolymer contained in the entire solution 0.3 – 30 percent by weight, the ratio of the vinyl compound monomer mixture contained in the entire solution 99.7 – 70 percent by weight, the sum of styrene, acrylonitrile and methyl methacrylate not less than 70 percent by weight of the entire vinyl compound monomer mixture, the gross total of 3.5 times amount of the precent by weight of acrylonitrile plus the percent by weight of alkyl methacrylate (wherein the alkyl group has one to three carbon atoms) within the range of 25 – 150 percent by weight and partition ratio of the monomer mixture in the activated ethylene-vinyl acetate copolymer and a resin obtained from the monomer mixture 0.6 – 1.18, whereby a polymerization liquor is prepared. Next, to this polymerization liquor, a radical polymerization initiator, a chain transfer agent and other additives if necessary are added, and the mixture is partially bulk polymerized with stirring at least until phase inversion takes place (this step is referred to herein as the "preliminary polymerization" step). To the pre-polymerized syrup thus obtained, a radical polymerization initiator, a chain transfer agent and other additives are added, if necessary, and the mixture is bulk polymerized or suspension polymerized to finally obtain a hardened polymer composition.

Further, the composition of the present invention may also be obtained in case an amount of the monomer to be polymerized in the presence of the graft activated ethylene-vinyl acetate copolymer is smaller than the aforementioned amount, by blending the locked resin component with the polymer (D) consisting of said vinyl compound monomer mixture (A) polymerized separately.

Furthermore, insofar as the ratio is below 50 percent by weight, preferably 30 percent by weight, another polymer or copolymer having compatibility with the composition of the present invention may be blended as occasion demands.

In the process of the present invention, the amount of $CH_2 = C(CH_3)COO-$ group, hereinafter referred to as the amount of a double bond, in said trunk rubber component (B) is measured as follows.

A toluene solution of a sample of the trunk rubber component (B) is thrown into a large amount of methanol to coagulate the sample. Thereafter it is washed in methanol several times and dried in vacuo at 20° – 30° C for 48 hours to obtain a spongy sample. Into a 200 ml triangular flask, 1.000 g of the sample and 30 cc of dioxane are charged. At the mouth of the triangular flask a refluxing condenser is provided, and the flask is immersed in a constant temperature vessel at 90° C to dissolve the sample uniformly. Next 3 cc of a 3.3N KOH methanol solution is added to carry out a reflux treatment for 120 minutes; further 50 cc of distilled water is added thereto to carry out a reflux treatment for 5 minutes. Continuously this treated material is cooled to room temperature; thereafter it is neutralized with 1 N hydrochloric acid standard liquid using phenolphthalein as an indicator. Next, 30 cc of an aqueous solution of 2 N hydrochloric acid and 20 cc of an aqueous solution of 40 g/l KBr are added. Thereafter, the resultant solution is filtered by suction in a Buchner funnel using several sheets of filter paper to obtain a colorless transparent aqueous solution. Onto this filtrate, an aqueous solution of 0.1 N $KBrO_3$ is added dropwise until the filtrate is colored yellow and the stopper of the flask is tightly closed and the flask is left to stand for 15 minutes. Next, 20 cc of an aqueous solution of 20 g/l KI is added and the mixture is immediately titrated with a standard liquid of 0.1 N $Na_2S_2O_3$ (the titre of the standard liquid of 0.1 N $Na_2S_2O_3$ in this case is made a cc). The control value is determined by carrying out the same operations with no sample (the titre of the standard liquid of 0.1 N $Na_2S_2O_3$ in this case is made b cc).

The quantity of double bond in the sample is calculated as follows:

Quantity of double bond = $(b - a)/2 \times 0.1$ millimole/g.

In the present invention, and as expressed in the claims, the partition ratio of (A) to (B) and (D) is defined and measured as follows. At first, 5 g of the activated trunk rubber component (B) and 5 g of the resin component are completely dissolved in 40 g of the monomer mixture (A) with vigorous stirring. In order to prevent polymerization about 0.1 percent of hydroquinone is added. Thereafter the mixed solution is transferred into a 100 cc measuring cylinder, which cylinder is allowed to stand in a constant temperature vessel at 70° C for 24 hours. A phase separation of an upper phase and a lower phase takes place. The upper phase is a solution of the monomer mixture (A) in the trunk rubber component (B), and the lower phase is a solution of the monomer mixture (A) in the resin component (D). The volume (d) of the upper layer divided by the volume (e) of the lower layer is the partition ratio, $d/e$.

In the process of the present invention, the degree of grafting of the graft polymer (C) is measured as follows: About 1 g of the final polymer composition is charged into a 200 cc triangular flask, to which 50 g of dimethyl formamide is added. The flask is immersed in a constant temperature vessel at 90° C with occasional shaking for about 14 hours and is left to stand in a room whose temperature is conditioned to 20° C for 24 hours. In this case, dimethyl formamide dissolves the resin component (D), but does not dissolve the graft polymer (C). The so-treated sample is ultracentrifuged at 17,000 r.p.m. Next, the supernatant is carefully inclined and dimethyl formamide is properly added to the residue and the mixture is ultracentrifuged. Such operation is repeated until the methanol does not become white and opaque when the supernatant is added to methanol. When such time comes, the residue is dried in vacuo and weighed. The degree of grafting is calculated by the following equation.

Degree of Grafting (percent by weight)

$$= \frac{\text{Weight of the residue after drying in vacuo minus weight of the trunk rubber component (B) in the sample}}{\text{Weight of the trunk rubber component (B) in the sample.}} \times 100$$

Measuring of the particle diameter in the present invention is carried out by the following process. A sample of a shaped article of the polymer composition is cut by a microtome (the thickness of the ultrathin section is considered to be 500 – 1,000A) and in case the amount of methyl methacrylate in the resin component (D) is not less than 70 percent by weight, the obtained ultrathin section is photographed under an electron microscope. Otherwise the section is exposed to the vapor of acrylonitrile at room temperature for 30 minutes, shadowed with chromium and photographed under an electron microscope. Next the photographs are printed and the particle diameters of at least 100 particles are measured. Because rubber particles vary in shape and their sectional areas in many cases are distorted away from the circular or the spherical, we have decided upon measuring particle diameters to apply the following measuring conditions. The longest diameter of a rubber particle is called $f$ and a diameter passing the center of $f$ and intersecting with $f$ at a right angle is called $g$, and an average of the two is called the particle diameter $h$.

$$h_i = (f_i + g_i)/2$$

The average particle diameter is an arithmetic mean. In the present invention, upon obtaining the graft polymer by reacting the monomer mixture (A) with the trunk rubber component (B), the respective compositions and combination of the compositions of the two are very important. It is necessary that these conditions should satisfy especially the following three points:

1. That a polymer composition having a high impact resistance is obtained
2. That the surface smoothness of a shaped article obtained by shaping the obtained polymer composition is excellent
3. By keeping the viscosity of the prepolymerized syrup during and after preliminary polymerization as low as possible, it is easily possible to practice phase inversion industrially Concerning point (1), in case the average particle diameter of the rubber phase is controlled to within the range of 0.1 – 3 microns, it is important to select the composition of the monomer mixture (A) grafting to the graft activating trunk rubber component (B) containing 5 – 30 percent by weight of vinyl acetate before activation to obtain a high impact resistance so that the gross total of one or more of an aromatic vinyl compound, alkyl methacrylate (wherein alkyl group has one to three carbon atoms) and acrylonitrile may occupy not less than 70 percent by weight, and the gross total of 3.5 times the amount of the percent by weight of acrylonitrile plus the percent by weight of alkyl methacrylate (wherein the alkyl group has one to three carbon atoms) may be within the range of 25 – 150 percent by weight of total weight of monomer mixture. When the gross total of one kind or more of the aromatic vinyl compound, alkyl methacrylate (wherein the alkyl group has one to three carbon atoms) and acrylonitrile becomes less than 70 percent by weight, it is not preferable because within the range of the rubber particle diameter of 0.1 – 3$\mu$ (microns), impact strength and other mechanical properties are reduced. And even if this condition is satisfied, unless the composition is selected so that the gross total of 3.5 times the amount of the percent by weight of acrylonitrile plus the percent by weight of alkyl methacrylate (wherein alkyl group has one to three carbon atoms) may be within the range of 25 – 150 percent by weight of total weight of monomer mixture a high impact resistance cannot be obtained. This empirical formula is obtained by experience, but it is found after repeating a very large number of experiments. In general, it is known that the polarity of polymers is in the sequence of polystyrene < polyalkyl methacrylate < polyacrylonitrile, from the experimental results of the present inventors, the degree of the polarity of polyacrylonitrile corresponds to about 3.5 times that of polyalkyl methacrylate, and it is considered after all that the affinity of the resin component (D) obtained from the monomer mixture (A) having a composition satisfying the aforementioned empirical formula with the trunk rubber component (B) enters a certain range necessary for obtaining a high impact resistance within the range of average rubber particle diameters of 0.1 – 3 microns. Accordingly, for instance, as a monomer (A), when acrylonitrile is not used, it becomes necessary to use 25 – 100 percent by weight of alkyl methacrylate and when as (A) alkyl methacrylate is not used, it becomes necessary to use 7.2 – 43 percent by weight (when made 3.5 times, it becomes about 25 – 150 percent by weight) of acrylonitrile.

Concerning the composition of the trunk rubber component (B), the vinyl acetate content is not particularly limited in respect of impact strength, but from the viewpoint of solubility in the monomer mixture (A), it is necessary to make the vinyl acetate content at least 5 percent by weight in an ethylene-vinyl acetate copolymer before activation.

The content of a double bond in the trunk rubber component (B) is limited to the range of 0.04 – 0.25 millimole/g, preferably 0.05 – 0.20 millimole/g. It is known that when the graft activated trunk rubber component (B) is high in graft activation ability and high in content of the double bond introduced into the side chain, upon bulk polymerizing a monomer dissolving these graft activated trunk rubber components (B) with stirring, a graft reaction takes place too much before phase inversion takes place and the polymerization system gelates. Upon preparing a thermoplastic resin, this gelation is a fatal deficiency. In case the content of the double bond introduced into the side chain is decreased to an extent where gelation does not take place, when the content of the double bond introduced into the side chain is relatively large, upon bulk polymerizing the monomer dissolving the trunk rubber component (B) with stirring, graft polymerization reaction takes place excessively to separate out the trunk rubber component (B) in a particulate state and it becomes not necessarily easy to have the rubber component take a phase separation structure, and even if a greater part of the trunk rubber component begins a phase separation, a tendency is strong that a part of the trunk rubber component remains in the molecular state dissolved in a hard resin layer. This tendency makes remarkably poor the shaping processability of the produced polymer composition. From these results, upon dissolving the trunk rubber component (B) graft activated by said process in the vinyl compound monomer to utilize the mixture for the preparation of an impact resistant resin, in order to keep good shaping processability of the produced polymer composition, the content of the double bond to be introduced into the side chain of a rubbery elastomer must be not more than 0.25 millimole/g. On the other hand, when the content of a double bond is too small, a necessary graft reaction does not take place sufficiently. The surface affinity between the resin layer and the rubber layer is insufficient and it is not necessarily possible to have the two layers take a surface affinity phase separation structure. And even if the surface affinity phase separation structure is realized, a polymer having a good impact resistance cannot be obtained. Moreover, because the average rubber particle diameter of the rubber particles generally becomes over 3μ, the surface smoothness of the shaped article becomes remarkably poor. From such viewpoint, in the present invention the minimum necessary amount of a double bond is 0.04 millimole/g of the trunk rubber component (B).

Figure 4:
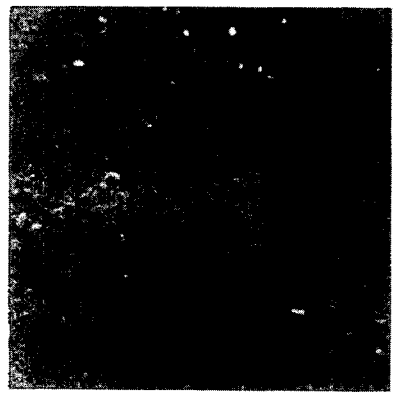
FIG. 4 shows a scanning electron microscope photograph of the surface of a shaped article of the resin according to the present invention whose rubber component has an average particle diameter of 0.4 microns.
Figure 5:
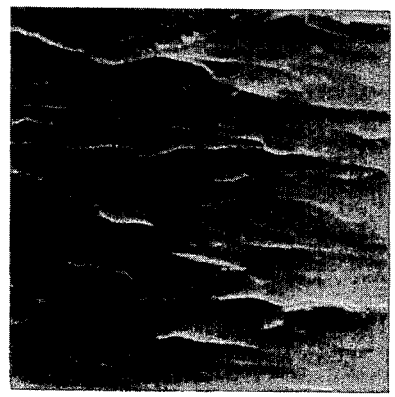
FIG. 5 shows a scanning electron microscope photograph of the surface of a shaped article of a resin whose rubber component has an average particle diameter of 5 microns.

Next, concerning the surface smoothness of a shaped article mentioned in (2) above, we have found that it is related to the average particle diameter of the rubber phase and the content of vinyl acetate in an ethylene-vinyl acetate copolymer constituting the trunk rubber component (B). Namely, in a polymer composition taking a phase separation structure wherein rubber particles disperse in a hard resin phase as that obtained in the present invention, between the rubber particle diameter and the surface situation of a shaped article of the polymer composition, there is an intimate relation and as the rubber particle diameter becomes small, the surface smoothness of the shaped article remarkably advances. On the other hand, the rubber particle diameter has an intimate relation with the impact strength of the polymer composition, and when the average particle diameter becomes below 0.1μ, the impact strength remarkably lowers, it being not preferable, and 0.1μ preferably 0.2μ becomes the lower limit of the average particle diameter. Generally, as the content of vinyl acetate before activation in the trunk rubber component (B) used becomes large, it is necessary to make the upper limit of the average particle diameter a low value. However, within the range of the content of vinyl acetate in an ethylene-vinyl acetate copolymer before activation of the present invention of not more than 30 percent by weight, when the particle diameter becomes over 3 microns, strictly judging over 2 microns, the surface condition of the shaped article becomes rough and the surface smoothness becomes poor. FIGS. 4 and 5 are scanning microscope photographs (magnification 800 times) of the surfaces of shaped articles of the resins whose average rubber particle diameters are 0.4 microns and 5 microns respectively. From these photographs it is apparent that the average rubber particle diameter affects the surface smoothness of a shaped article greatly and it is known that when the average rubber particle diameter is 0.1 – 2.0 microns, the surface smoothness is very excellent.

When the content of vinyl acetate in the trunk rubber component (B) used becomes small, with the same rubber particle diameter, the surface smoothness improves, which is considered to be due to the fact that the coefficients of heat expansion of a hard resin phase and a rubber phase become nearer as the content of vinyl acetate decreases. Namely, in respect of (2) also, a process of using a trunk rubber component (B) whose content of vinyl acetate before activation is relatively low as in the present invention has a great advantage.

Finally, about easily causing phase inversion industrially by keeping the viscosity of a prepolymerized syrup as low as possible during and after preliminary polymerization of (3), it is greatly affected by the partition ratio of the monomer mixture (a) in the trunk rubber component (B) and the resin component (D). In the present invention, particulate dispersion of rubber is realized by a process of partially bulk prepolymerizing a solution wherein a rubbery material is dissolved in a monomer with stirring at least until phase inversion takes place. The phase inversion as herein referred to means the following: when a monomer dissolving rubber is polymerized with stirring, because the hard polymer product has little affinity with rubber, it separates. However at first, the amount of hard polymer being small as compared with that of rubber, a rubber phase dissolved in the monomer forms a continuous phase and the hard polymer dissolved in the monomer forms a discontinuous dispersed phase. However, as the polymerization further proceeds and the amount of the hard polymer becomes larger, inversion of phase takes place whereby the hard polymer dissolved in the monomer forms a continuous phase and the rubber phase dissolved in the monomer forms a discontinuous dispersed phase. This phenomenon is called phase inversion. The phase inverted prepolymerized syrup is subjected to complete polymerization by suspension polymerization or bulk polymerization, substantially free from stirring.

Accordingly, in practicing this process industrially, it is preferable to keep the viscosity of the prepolymerized syrup as low as possible after completion of the preliminary polymerization. When this viscosity is remarkably high during the preliminary polymerization, the prepolymerized syrup winds up around the stirrer with the result that phase inversion does not take place sufficiently and it becomes impossible to practice the process.

In order to keep the viscosity of the syrup as low as possible after completion of the preliminary polymerization, it becomes naturally necessary to make the polymer content (sum of rubber and hard polymer) in the syrup immediately after phase inversion as low as possible, and to make the molecular weight thereof as low as possible.

Referring to the molecular weight of the polymer, because it cannot be changed greatly in order to keep the mechanical properties of the polymer composition above a certain level, it is important to make the polymer content in the syrup as low as possible immediately after completion of phase inversion.

The polymer content in the syrup immediately after completion of phase inversion naturally lowers when the trunk rubber component (B) in the polymer composition is decreased. However, this method is not preferable because by this method the impact strength of the polymer composition lowers. Accordingly, a method of decreasing the polymer content in the syrup immediately after completion of phase inversion without decreasing the content of the trunk rubber component (B) becomes necessary. Therefore, as a result of detailed study about the elements for causing phase inversion fast, it is found that the partition ratio is very important.

When comparison is made using the same content of the trunk rubber component (B), the higher the partition ratio is made, the higher becomes the polymer content at which phase inversion takes place in the preliminary polymerization (namely, conversion of polymerization). The partition ratio changes mainly due to compositions of the trunk rubber component (B) and the resin component (D) [the same composition as the monomer mixture (A)]. For instance, when the content of vinyl acetate in the trunk rubber component (B) increases, the partition ratio increases and when the content of acrylonitrile in the resin component (D) increases, the partition ratio decreases.

Accordingly, the lowest possible partition ratio is preferable because phase inversion takes place at a low polymer content (namely, conversion of polymerization), which on the other hand, the amount of the monomer mixture (A) grafting to the trunk rubber component (B) becomes naturally low when the conversion of polymerization at which phase inversion takes place becomes low, after all the necessary graft reaction does not take place sufficiently, the interfacial affinity between the resin phase and the rubber phase is not sufficient. It is not necessarily possible to have the two phases take a sufficient interfacial affinity phase separation structure, even if the interfacial affinity phase separation structure is realized. A polymer having a good impact resistance is not obtained and because the average particle diameter of rubber particles becomes over 3μ the surface smoothness of a shaped article becomes remarkably poor. From such viewpoint, the lower limit of the partition ratio is 0.6, preferably 0.65.

Concerning the upper limit, in order that phase inversion may take place when the weight of the hard resin produced until phase inversion is within about 3 times that of the trunk rubber component (B), it is necessary to make the partition ratio not more than 1.18, preferably not more than 1.1. Again, the partition ratio has a close relation with the shape of the rubber phase in the polymer composition. Namely, at a partition ratio of above 1.18, rubber particles always take the shape of spherical film or aggregate of spherical films in which the resin component is filled when such polymerization condition as to be able to obtain a high impact strength is taken. However, in case a partition ratio is not more than 1.18 rubber particles do not necessarily take the shape of spherical film or aggregate of spherical films when the polymerization condition same as above is taken. The reason with a border of a partition ratio of 1.18, difference is brought about in the shape of rubber particles, is supposed that when the partition ratio is over 1.18, in the preliminary polymerization the monomer mixture (A) is partitioned in the rubber phase at a considerably higher ratio than in the resin. As a result in rubber particles many resin phases tend to be filled, whereas when the partition ratio is not more than 1.18, the amount of the resin phases contained in the rubber particles become small and the rubber particles are unlikely to become spherical film or aggregate of spherical films. Accordingly, at the partition ratio of above 1.18 that the rubber particles are spherical film or aggregate of spherical films is a necessary condition for the polymer blend to exhibit an excellent impact strength. However, when the partition ratio is not more than 1.18, it is not necessarily a necessary condition.

From reasons mentioned above, it is necessary to so decide combination of compositions of the trunk rubber component (B) and the resin component (D), namely, the monomer mixture (A) that it may satisfy the partition ratio of 0.6 – 1.18.

In the present invention, in case phase inversion is caused at a relatively low conversion of polymerization as mentioned above, the amount of the monomer mixture (A) grafting to the trunk rubber component (B) until such time when phase inversion takes place tends to become smaller as compared with a case wherein conversion of polymerization at which phase inversion takes place is high. Accordingly, in order to cause a sufficient graft reaction necessary for achieving the object of the present invention, the necessary amount of a double bond in the trunk rubber component (B) becomes not less than 0.04 millimole per gram of weight of the trunk rubber component (B).

The trunk rubber component (B) graft activated by being introduced with a double bond into its side chain is prepared by reacting said ethylene-vinyl acetate copolymer (I) or an ethylene-vinyl acetate —vinyl alcohol copolymer (II) obtained by partial hydrolysis of (I) with methacrylic acid (a), an acid anhydride thereof (b), acid chloride thereof (c) or an alkyl ester thereof having an alkyl group having one to eight carbon atoms (d). In this case, if necessary, known catalysts in an ester interchange reaction or an esterification reaction, for instance, an acid catalyst such as hydrochloric acid, sulfuric acid and para-toluenesulfonic acid, or an alkali catalyst such as an alcoholate of an alkali metal such as sodium, potassium and lithium having one to 14 carbon atoms like sodium methoxide, potassium methoxide, potassium ethoxide and lithium butoxide, or an organic base such as pyridine are used. For instance, in combination of (I) with (d), it is possible to introduce a double bond into the side chain of (I) by directly carrying out an ester interchange reaction using sodium methoxide as a catalyst, and in combination of (II) with (c), it is possible to introduce a double bond into the side chain of (II) by an esterification reaction without using a catalyst. In combination of (II) with (a), it is possible to introduce a double bond into the side chain of (II) using para-toluenesulfonic acid as a catalyst. As mentioned above, when the amount of a double bond to be introduced is too large, on the way of preparing an impact resistant resin, it gelates to become a three dimensional network structure or it becomes difficult to have two phases take a phase separation structure. And even if it is possible to have the two phases take a phase separation system, shaping processability of the obtained polymer composition becomes very inferior. And in order to obtain a good impact resistance, it is at first necessary to have the two phases take a proper interfacial affinity phase separation structure and the degree of grafting has to be limited to the range of 20 – 500 percent by weight, preferably 30 – 300 percent by weight. From these factors, the necessary amount of a double bond to be introduced is 0.04 – 0.25 millimole (preferably 0.05 – 0.20 millimole per gram of weight of the trunk rubber component (B). The control of these double bonds to be introduced is carried out by controlling the reaction temperature, reaction period, amount of a catalyst upon reacting (I) or (II) with (a), (b), (c) or (d) and amount of reactants.

The reaction temperature is entirely different depending upon the kind of combination of (I) or (II) with (a), (b), (c) or (d), use or otherwise of a catalyst, the kind of catalyst, the amount of a catalyst and the amount of the objective double bond to be introduced. Therefore, it is not possible to decide it generally. However, normally it is within the range of 40° – 150° C. From the same reason, the reaction period cannot be decided generally, but it is normally from 10 minutes to 10 hours. In case of using a catalyst, from the same reason the adding amount of a catalyst cannot be decided generally. However, normally it is 0.01 – 10 percent by weight based on the reaction mixture.

As an especially preferable method of introducing a double bond, a case of carrying out an ester interchange reaction of an ethylene-vinyl acetate copolymer in a copolymerizable vinyl compound monomer mixture at least containing alkyl methacrylate in the presence of alkoxide of an alkali metal as a catalyst is operationally especially effective. Namely, when this process is adopted, different from other processes, it is unnecessary to recover the activated trunk rubber component (B) by operation like precipitation, and to a solution completed of said activation reaction, vinyl compound monomers are added so that the composition of the vinyl compound monomer mixture may become the composition of the necessary monomer mixture (A). It is possible per se to transfer to a second step of polymerization operation. In said ester interchange reaction, a vinyl compound monomer usable as a solvent in admixture with alkyl methacrylate is, as mentioned above, what is at least copolymerizable with alkyl methacrylate and necessarily dissolves an ethylene-vinyl acetate copolymer like styrene. However, generally it is possible to use vinyl compound monomers which are poor solvents to an ethylene-vinyl acetate copolymer in admixture insofar as its concentration is within such range as not precipitating an ethylene-vinyl acetate copolymer.

As alkoxide of an alkali metal, practically alkoxide of an alcohol having not more than 14 carbon atoms of an alkali metal such as Li, Na and K is effective.

As mentioned above, one method of polymerizing a rubbery material dissolved in a monomer to prepare a phase separation structure wherein the rubber component disperses in particulate state in the resin phase is to carry out partial preliminary bulk polymerization of a monomer dissolving a rubbery material with stirring at least until phase inversion takes place.

Generally, because this phase inversion takes place from the vicinity of a point where the amount of the entire polymer in the polymerization system exceeds about 1.5 times that of a rubbery polymer, it is important to carry out partial bulk polymerization while controlling the stirring speed from the time when the amount of the entire polymer exceeds about 1.5 times that of a rubbery polymer until at least phase inversion takes place.

The particle diameter of the particles of the rubber phase is decided mainly by compositions of the monomer mixture (a) and the trunk rubber component (B) and a degree of grafting of the graft polymer (C) when phase inversion takes place. However, it is affected by conditions of the preliminary polymerization. As conditions of the preliminary polymerization affecting the particle diameter, there are the shape of a polymerization vessel, the shape of a stirring device, r.p.m. of the stirrer and the final conversion of preliminary polymerization. However, above all the conversion preliminary polymerization is important, and as mentioned above, it is necessary to carry out preliminary polymerization at least until phase inversion takes place.

The stirring speed in this preliminary polymerization cannot be decided generally because the scope of the conditions differs by scale at which the polymerization is carried out, size and shape of the stirring blade and kind and amount of a chain transfer agent used. However, it is necessary to make it a stirring speed imparting a shearing strength necessary to at least cause phase inversion, and normally a condition of making the edge speed of the stirring blade at least 1 m/min. is selected.

The temperature at this preliminary bulk polymerization is normally within the range of 40°– 250° C, preferably 45°– 220° C. When the polymerization temperature is lower than this range, practical polymerization rate cannot be obtained and occasionally the trunk rubber component (B) does not uniformly dissolve in the monomer mixture (A). When the polymerization temperature is higher than this range, the polymer deteriorates, both being not preferable.

In this preliminary bulk polymerization, after phase inversion, the longer the polymerization period becomes, the longer the stirring period becomes and the smaller tends to become the rubber particle diameter. Accordingly, the termination timing of the preliminary polymerization is selected by making the particle diameter of rubber to what extent and to what extent the viscosity of the prepolymerized syrup should be limited. However, it is necessary to carry out the preliminary polymerization at least until the amount of the entire polymer exceeds about 1.5 times that of the rubber component and phase inversion takes place.

Upon actual practice of the present invention, samples prepared by various combinations of these conditions of the preliminary polymerization are observed under an electron microscope and the conditions of the preliminary polymerization are selected so that the average particle size may be within the range of $0.1 - 3\mu$.

The polymerization temperature of the bulk polymerization or the suspension polymerization carried out next to the preliminary polymerization is normally 30°– 250° C, preferably 45°– 220° C.

The stirring condition in this case is, in case of bulk polymerization it is necessary to maintain the shearing rate at a level insufficient for causing shearing of the rubber phase, preferably stirring is substantially not imparted. In suspension polymerization, it is necessary to impart stirring necessary for stably dispersing beads, preferably a condition of making the edge speed of the stirring blade at least 30 m/min. is selected.

A polymerization initiator used in the preliminary polymerization, the bulk polymerization or the suspension polymerization is an ordinary oil-soluble polymerization initiator, and it is preferably an azo compound or a peroxide initiator having a decomposition rate of at least $5 \times 10^{-6}$ sec.$^{-1}$ at 85° C, such as, for instance, an azo compound like azobisisobutyronitrile, azobis 2 methyl butyronitrile, azobis 2, 3 dimethyl butyronitrile, azobis 2, 3, 3 trimethyl butyronitrile, azobis 2 isopropyl butyronitrile, azobis 2 isopropyl 3 methyl butyronitrile, azobis 2 methyl valeronitrile, azobis 2, 4 dimethyl valeronitrile, azobis 2, 4, 4 trimethyl valeronitrile, azobis 2 isobutyl 4 methyl valeronitrile, azobiscyclobutane nitrile, azobiscyclopentane nitrile, azobiscyclohexane nitrile, azobiscyloheptane nitrile, azobis 2 methyl heptylonitrile, azobis-1-(2 methyl cyclohexane) nitrile, azobiscyclohexane carbonitrile, azobiscyclooctane nitrile, azobiscyclopropylpropionitrile, azobiscyclopentyl propionitrile, azobiscyclohexylpropionitrile, azobis 2 benzylpropionitrile and azobiscyclodecanenitrile, and a peroxide like lauroyl peroxide, heptanone peroxide, acetylcyclohexylsulfonyl peroxide, cyclohexane acetyl peroxide, octanoyl peroxide decanoyl peroxide, caprylyl peroxide, 5 phenylvaleryl peroxide, benzoyl peroxide, p-chlorobenzoyl peroxide, t-butyl peroxy 2 ethyl hexanoate, acetyl peroxide, succinic acid peroxide, propionyl peroxide, stearoyl peroxide, 3, 5, 5-trimethyl hexanoyl peroxide, t-butyl peroxy pivalate, 2, 4 dichlorobenzoyl peroxide, di-2-ethylhexyl peroxy dicarbonate, diisopropyl peroxy di-carbonate, isobutyl peroxide and t-butyl peroxy isobutylate.

As has been heretofore known, upon preparing an impact resistant resin by producing a chain transfer-type graft polymer, it has been necessary to use a peroxide initiator large in hydrogen withdrawing capacity. However, in the present invention for preparing a copolymerization type graft copolymer even when an azo compound such as azobisisobutyronitrile hardly having any hydrogen withdrawing capacity is used, a sufficiently effective graft polymer can be produced. In addition, when a high temperature decomposition type peroxide initiator such as di-t-butyl peroxide and t-butyl peracetate having large hydrogen withdrawing capacity and large capacity of cross-linking a rubbery material are used in the preliminary polymerization, generally the prepolymerized syrup tends to gelate by cross-linking, being not preferable in many cases.

Especially that an initiator such as azobisisbutyronitrile and lauroyl peroxide having hardly any hydrogen withdrawing capacity can be utilized makes it possible to use all kinds of mercaptan-type chain transfer agents (because an initiator having large hydrogen withdrawing capacity generally reacts with mercaptans, being not preferable) and upon preparing a polymer composition containing acrylonitrile, the tendency to be colored yellow can be avoided, it being very advantageous.

When the monomer mixture contains an aromatic vinyl compound such as styrene, it is possible to heat polymerize said mixture at a polymerization temperature of 80° C – 250° C without using an initiator.

The amount of trunk rubber component (B) used in the present invention should not be too large in order to have a phase separation structure taken and should not be too small in order to obtain a practicable impact resistance. Accordingly, it is necessary that the amount of the trunk rubber component used is 0.3 – 30 percent by weight, preferably 1 – 20 percent by weight in the finally obtained polymer composition.

Upon carrying out aqueous suspension polymerization, as a suspension stabilizer suspensor a water soluble high molecular weight compound such as polyvinyl alcohol, a styrenemaleic acid copolymer, acrylamide copolymer and sodium methacrylate copolymer and an inorganic compound such as carbonate, sulfate, phosphate and hydroxide which are hardly soluble in water may be used.

Upon carrying out radical polymerization, in order to adjust the molecular weight of the polymer composition, generally known chain transfer agents, for instance, mercaptans such as n-butylmercaptan, tert-butylmercaptan, n-dodecylmercaptan and tert-dodecyl mercaptan, α-thiopropionic acid, β-thio-propionic acid, thioglycollic acid, thioglycol and α-methyl styrene dimer may be added. When a chain transfer agent is added in the preliminary polymerization step, it becomes possible to reduce the viscosity of a prepolymerized syrup and reduce the degree of grafting of the monomer mixture (A) in the graft polymer (C).

The composition of the present invention obtained by the foregoing process consists of 0.36 – 70 percent by weight (of which a trunk rubber component (B) is 0.3 – 30 percent by weight, preferably 1 – 20 percent by weight of the entire composition) of a graft polymer (C) 20 – 500 percent of the degree of grafting a monomer mixture (A) to the trunk rubber component and 10 – 99.64 percent of a hard polymer (resin component) (D) obtained by radical polymerizing the monomer mixture (A).

When the degree of grafting becomes high such as above 500 percent, affinity of the rubber phase with the resin phase becomes too high and dispersed particle diameters of rubber become too small and what has a high impact strength cannot be obtained and shaping processability becomes poor too.

And when the degree of grafting becomes lower than 20 percent, affinity of the rubber phase with the resin phase becomes insufficient. It becomes not necessarily possible to have the two phases take a sufficient interfacial affinity phase separation structure, and even if the interfacial affinity phase separation structure is realized, a polymer having a good impact strength cannot be obtained and because the average particle size of rubber becomes over 3μ, the surface smoothness of the shaped article becomes remarkably inferior.

In the present invention, it is necessary that composition ratios of the graft polymer (C) and the hard polymer (D) should be 0.36 – 90 percent by weight, preferably 1 – 85 percent by weight of (C) and 10 – 99.64 percent by weight, preferably 15 – 99 percent by weight of (D). When the graft polymer (C) becomes lower than 0.36 percent by weight, substantially an impact strength does not become high, it being not preferable. When the graft polymer (C) becomes more than 90 percent by weight, the fluidity of the finally obtained polymer composition when melted becomes poor, shaping processability becomes difficult and the tensile strength lowers, it being not preferable. In formulating the thermoplastic resin of the present invention, additional ingredients such as coloring materials, fillers, antioxidants, ultraviolet ray stabilizers, plasticizers and lubricants may be incorporated therewith.

Almost all of the impact resistant resin heretofore having been commercially available utilizes as rubber component a synthetic rubber of the conjugated diolefin series. Accordingly, due to an unsaturated bond essentially existing in the main chain of the rubber component, weatherability and ozone resistance are inferior and hardly withstand practical use outdoors.

The present invention has succeeded in the preparation of a practical impact resistant resin by using as rubber component an ethylene-vinyl acetate copolymer containing 5 – 30 percent by weight of vinyl acetate excellent in weatherability and ozone resistance and inexpensive, which resin can be extensively used in outdoor use and electric use required of impact resistance.

EXAMPLE A

Preparation of an Activated Ethylene-vinyl Acetate Copolymer-1

Into a 7 liter reaction can provided with a stirrer and a cooling pipe, while passing dry nitrogen, 1,000g of an ethylene-vinyl acetate copolymer, 1,000 g of distilled and purified methyl methacrylate (water content 150 – 400 ppm) and 3,000 g of purified styrene were charged without contacting air, and the mixture was stirred at 80° C for about 30 minutes to prepare a uniform solution. Next, the temperature of the reaction system was adjusted to the predetermined temperatures mentioned below. Thereafter an alcohol solution of alkoxide of an alkali metal was added as a catalyst to said solution and the mixed solution was reacted with stirring for 1 hour. After the reaction was completed acetic acid in an amount equivalent to the amount of added alkali was added to neutralize the reaction system to obtain a monomer solution containing 20 percent by weight of an activated ethylene-vinyl acetate copolymer. Next a part of this solution was thrown into a large amount of methanol to coagulate the polymer to obtain an activated ethylene-vinyl acetate copolymer.

An ethylene-vinyl acetate copolymer used in the activation reaction was five kinds of "Evaflex."

"Evaflex" No. 40 (vinyl acetate content 40 percent by weight)
"Evaflex" No. 260 (vinyl acetate content 28 percent by weight)
"Evaflex" No. 360 (vinyl acetate content 25 percent by weight)
"Evaflex" No. 460 (vinyl acetate content 19 percent by weight)
"Evaflex" No. 550 (vinyl acetate content 14 percent by weight), all manufactured by Mitsui Polychemical Co., Ltd.

As the activation temperature, 60° C, 70° C and 75° C were used. The alcohol solution of alkoxide of an alkali metal used as a catalyst was the following seven kinds:

a. A methanol solution of sodium methoxide (alkali concentration 3.03 normal)
b. A methanol solution of sodium methoxide (alkali concentration 1.16 normal)
c. A methanol solution of sodium methoxide (alkali concentration 1.77 normal)
d. A n-propanol solution of sodium-n-propoxide (alkali concentration 1.81 normal)
e. A n-butanol solution of sodium-n-butoxide (alkali concentration 1.79 normal)
f. A methanol solution of potassium methoxide (alkali concentration 1.52 normal)
g. A methanol solution of lithium methoxide (alkali concentration 1.63 normal)

The activation reaction conditions and the amounts of a double bond in the obtained activated ethylene-vinyl acetate copolymers are shown in Table A.

TABLE A

| Obtained activated ethylene-vinyl acetate copolymer | "Evaflex" used (#) | Activation temperature (° C.) | Catalyst solution used | Adding amount of catalyst solution (cc.) | Amount of a double bond in activated ethylene-vinyl acetate copolymer (mmol./g.) |
|---|---|---|---|---|---|
| A-1  | 260 | 60 | a | 25  | 0.092 |
| A-2  | 260 | 60 | c | 70  | 0.008 |
| A-3  | 260 | 60 | c | 88  | 0.103 |
| A-4  | 260 | 60 | c | 105 | 0.164 |
| A-5  | 260 | 60 | c | 125 | 0.370 |
| A-6  | 360 | 60 | a | 15  | 0.013 |
| A-7  | 360 | 60 | a | 20  | 0.060 |
| A-8  | 360 | 60 | a | 35  | 0.185 |
| A-9  | 360 | 60 | a | 50  | 0.270 |
| A-10 | 360 | 60 | b | 75  | 0.089 |
| A-11 | 360 | 60 | c | 75  | 0.124 |
| A-12 | 360 | 60 | d | 75  | 0.131 |
| A-13 | 360 | 60 | e | 75  | 0.095 |
| A-14 | 360 | 60 | f | 75  | 0.100 |
| A-15 | 360 | 60 | g | 75  | 0.107 |
| A-16 | 460 | 70 | b | 70  | 0.010 |
| A-17 | 460 | 70 | b | 75  | 0.085 |
| A-18 | 460 | 70 | b | 80  | 0.126 |
| A-19 | 460 | 70 | b | 85  | 0.199 |
| A-20 | 460 | 70 | b | 125 | 0.630 |
| A-21 | 460 | 70 | c | 75  | 0.078 |
| A-22 | 460 | 70 | c | 80  | 0.120 |
| A-23 | 550 | 75 | b | 70  | 0.008 |
| A-24 | 550 | 75 | b | 80  | 0.103 |
| A-25 | 550 | 75 | b | 125 | 0.701 |
| A-26 | 40  | 60 | a | 20  | 0.021 |
| A-27 | 40  | 60 | a | 23  | 0.093 |
| A-28 | 40  | 60 | a | 26  | 0.131 |

EXAMPLE B

Preparation of an Activated Ethylene-vinyl Acetate Copolymer-2

Into a 7 liter reaction can provided with a stirrer and a cooling pipe, while passing dry nitrogen, 1,000 g of an ethylene-vinyl acetate copolymer ("Evaflex" No. 460, vinyl acetate content 19 percent by weight, manufactured by Mitsui Polychemical Co., Ltd.), 3,000 g of distilled and purified styrene (water content 150 – 400 ppm), 500 g of methyl methacrylate and 500 g of one kind of each of the following copolymerizable alkyl methacrylate were charged without contacting air, and the mixtures were stirred at 70° C for about 2 hours to prepare uniform solutions.

Examples B-1, B-2, B-3, B-4     ethyl methacrylate
Example B-5     n-butyl methacrylate
Examples B-6, B-7     n-propyl methacrylate Next, as a catalyst a methanol solution of sodium methoxide (alkali concentration 1.16 normal) was added to said solutions, and the mixed solutions were reacted at 70° C with stirring for 1 hour. After completion of the reactions acetic acid in an amount equivalent to the amount of the added alkali was added to neutralize the reaction systems to obtain solutions, each containing 20 percent by weight of an activated ethylene-vinyl acetate copolymer. Next, a part of this solution was thrown into a large amount of methanol to coagulate the polymer to obtain an activated ethylene-vinyl acetate copolymer.

When the amount of the adding catalyst was varied, activated ethylene-vinyl acetate copolymers having the contents of a double bond as shown in the following Table B were obtained.

TABLE B

| Obtained activated ethylene-vinyl acetate copolymer | Composition and weight ratio of the solvent (monomer) in the activation reaction system | Adding amount of catalyst solution (cc.) | Amount of a double bond in activated ethylene-vinyl acetate copolymer (mmol./g.) |
| --- | --- | --- | --- |
| B-1 | Styrene/methyl methacrylate/ethyl methacrylate (30/5/5). | 70 | 0.014 |
| B-2 | do | 75 | 0.103 |
| B-3 | do | 80 | 0.167 |
| B-4 | do | 125 | 0.669 |
| B-5 | Styrene/methyl methacrylate/n-butyl methacrylate (30/5/5). | 75 | 0.088 |
| B-6 | Styrene/methyl methacrylate/n-propyl methacrylate (30/5/5). | 80 | 0.120 |
| B-7 | do | 80 | 0.175 |

EXAMPLE C

Preparation of Activated Ethylene-vinyl Acetate Copolymer-3

Into a 7 liter reaction can provided with a stirrer and a cooling pipe, while passing dry nitrogen, 1,000 g of an ethylene-vinyl acetate copolymer ("Evaflex" No. 360 containing 25 percent by weight of vinyl acetate, manufactured by Mitsui Polychemical Co., Ltd.), 1,000 g of distilled and purified methyl methacrylate (water content 150 – 400 ppm) and 3,000 g of toluene was charged without contacting air. The mixture was stirred at 60° C for about 2 hours to prepare a uniform solution. Next, as a catalyst a methanol solution of sodium methoxide (alkali concentration 3.03 normal) was added. The mixed solution was reacted at 60° C for 1 hour, and thereafter the solution completed of the reaction was thrown into a large amount of methanol to obtain an activated ethylene-vinyl acetate copolymer.

The adding amounts of the catalyst at the reaction and the amounts of a double bond in the obtained activated ethylene-vinyl acetate copolymers were as shown in the following Table C.

TABLE C

| Example | Amount of a methanol solution of sodium methoxide (cc) | Amount of an introduced double bond (m mol/g) |
| --- | --- | --- |
| C-1 | 70 | 0.009 |
| C-2 | 75 | 0.118 |
| C-3 | 80 | 0.191 |
| C-4 | 85 | 0.287 |

EXAMPLE D

Preparation of an Activated Ethylene-vinyl Acetate-vinyl Alcohol Copolymer-1

Into a 1 liter flask provided with a stirrer and a cooling pipe, 160 g of one kind each of activated ethylene-vinyl acetate copolymers A-4, A-8, A-19, B-3, B-7 and C-3 obtained in Examples A, B and C and 800 g of toluene were charged. The mixture was stirred at 70° C to prepare a uniform solution. Thereafter the reaction system was cooled to 50° C. 70cc of a methanol solution of 0.3N sodium hydroxide was added to the reaction system which was kept at 50° C for 0.5 hour with stirring to carry out partial hydrolysis. After the reaction was completed 14cc of 2N hydrochloric acid was added to neutralize the reaction system. Thereafter the produced solution was flowed into a large amount of methanol to coagulate the polymer. The activated ethylene-vinyl acetate-vinyl alcohol copolymer was taken out and dried in vacuo at 30° C for 48 hours. The ratio of hydrolysis of the original activated ethylene-vinyl acetate copolymer and the amounts of a double bond in the obtained activated ethylene-vinyl acetate-vinyl alcohol copolymers were as shown in Table D.

TABLE D

| Obtained activated ethylene-vinyl acetate vinyl alcohol copolymer | Original activated ethylene-vinyl acetate copolymer | Ratio of hydrolysis (%) | Amount of a double bond in the obtained activated ethylene-vinyl acetate-vinyl alcohol copolymer (m mol/g) |
| --- | --- | --- | --- |
| D-1 | A-4 | 35 | 0.092 |
| D-2 | A-8 | 32 | 0.117 |
| D-3 | A-19 | 26 | 0.084 |
| D-4 | B-3 | 27 | 0.106 |
| D-5 | B-7 | 29 | 0.125 |
| D-6 | C-3 | 33 | 0.127 |

EXAMPLE E

Preparation of an Activated Ethylene-vinyl Acetate-vinyl Alcohol Copolymer-2

Into a 15 liter reaction can, 9,000 g of toluene and 900 g of an ethylene-vinyl acetate copolymer ("Evaflex" No. 360 containing 25 percent by weight of vinyl acetate, manufactured by Mitsui Polychemical Co., Ltd.) were charged with stirring at 70° C to prepare a uniform solution. Next, the internal temperature of the reaction can was cooled to 50° C. 600 cc of a methanol solution of 0.3N sodium hydroxide was added. The mixture was reacted with stirring at 50° C for 0.5 hour. After completion of the reaction, the reaction solution was neutralized by an aqueous solution of 2N acetic acid. Thereafter a large amount of methanol was added to precipitate the polymer to prepare an ethylene-vinyl acetate-vinyl alcohol copolymer.

In a 2 liter flask having a round bottom provided with a stirrer and a cooling pipe, in 1,200 g of toluene dehydrated by an activated alumina (Neobead P), 120 g of said ethylene-vinyl acetate-vinyl alcohol copolymer was dissolved, to which solution 21.6 g of methacrylic acid chloride was added. The mixture was reacted with stirring at 55° C. Thereafter a large amount of methanol was added to precipitate the polymer to prepare an activated ethylene-vinyl acetate-vinyl alcohol copolymer to whose side chain

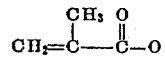

group was introduced. In this case, when the reaction time was varied to two levels of 3.5 hours (Example E-1) and 6 hours (Example E-2), the amounts of double bonds in the produced activated ethylene-vinyl acetate-vinyl alcohol copolymers were 0.080 millimol/g (Example E-1) and 0.132 millimol/g (Example E-2), respectively.

EXAMPLE F

Preparation of an Activated Ethylene-vinyl Acetate-vinyl Alcohol Copolymer-3

Into a 2 liter flask having a round bottom provided with a stirrer and a cooling pipe, 250 g of the ethylene-vinyl acetate-vinyl alcohol copolymer obtained in the first half of said Example E, 500 g of toluene, 500 g of methacrylic acid, 10 g of p-toluene sulfonic acid and 5 g of hydrquinone were charged and dissolved and stirring was continued at 80° C while gently passing nitrogen gas. Three hours after the solution inside the flask was flowed into a large amount of methanol to recover the polymer to thereby obtain an activated ethylene-vinyl acetate-vinyl alcohol copolymer to whose side chain $CH_2 = C(CH_3)$ COO— group was introduced.

The amount of the introduced double bond in this case was 0.116 millimole/g.

EXAMPLE G

Preparation of an Activated Ethylene-vinyl Acetate-vinyl Alcohol Copolymer-4

Into a 1 liter flask having a round bottom provided with a stirrer and a cooling pipe, 70 g of the ethylene-vinyl acetate-vinyl alcohol copolymer obtained in the first half of said Example E, 200 g of toluene and 200 g of pyridine were charged and the mixture was stirred at 70° C to prepare a uniform solution, to which 500 cc of a mixed (1:10 by weight ratio) methacrylic anhydride-pyridine solution was added and the resultant mixed solution was reacted with stirring at 70° C for 3 hours. After completion of the reaction, the produced polymer solution was flowed into a large amount of methanol to coagulate the polymer to thereby obtain an activated ethylene-vinyl acetate-vinyl alcohol copolymer. The amount of the introduced double bond in this case was 0.122 millimol/g.

EXAMPLE 1

(Examples 1 – 1 – 1 –3)

In a 1 liter flask provided with a cooling pipe, a thermometer, a nitrogen inlet and a stirring device, 45 g of one kind each of the activated ethylene-vinyl acetate copolymers A-1, A-3 and A-4 obtained in said Example A was dissolved in 346 g of styrene and 109 of acrylonitrile with stirring at 73° C. After the solution became uniform, 1 g of tert-dodecyl mercaptan and 0.05 g of azobisisobutylonitrile were added thereto and dissolved therein until the solution became uniform. At the same time, r.p.m. of the stirring device was fixed at 250 –300 r.p.m., while nitrogen was being passed at the same temperature of 73° C. A partial bulk polymerization was started. About 6 hours after addition of the initiators when the total solid component content became 24.5 – 26 percent, because it could be confirmed that phase inversion took place. The reaction system was cooled by ice water to terminate the polymerization. Next, to this system 1.75 g of azobisisobutylonitrile was added and at room temperature the mixture was stirred for about 0.5 hour to apparently uniformly dissolve it in said partial polymer.

On the other hand, into a 2 liter flask provided with a cooling pipe, a thermometer, a nitrogen inlet and a stirring device, 1 liter of water, 10g of polysodium methacrylate and 10 g of a sodium dihydrogen phosphate 2 hydrate were charged to prepare a well dissolved water phase for suspension polymerization, to which said preliminary polymerized syrup dissolving azobisisobutylonitrile was added. R.p.m. of the stirring device was fixed at about 350 r.p.m. and the temperature was 70° C to start suspension polymerization.

The temperature of the suspension polymerization was heating at 70° C for 4 hours. The temperature was raised to 90° C in 30 minutes and heating at 90° for 3 hours. In such way the polymerization was completed. Next, the obtained polymer was filtered, washed and dried. The physical properties of what was obtained by injection moulding, the so obtained suspension polymer. The result of an electron microscope photograph of the ultra thin section and the surface smoothness of an injection moulded piece were shown in Table 1. In composition of this polymer, the partition ratios were all 1.12.

The estimation of the physical properties of the obtained polymer composition in Examples and Referential Examples in the present invention were carried out under the following conditions.

(Measuring conditions: 23° C, 55 percent RH)
Izod impack strength (notched)
(kg cm/cm of notch) ASTMD 256 – 56
Tensile strength at yield (kg/cm$^2$): ASTM 638 – 58 T
(tensile speed: 5 mm/min.)
Elongation at break (%): ASTMD 638 – 58 T
Haze value: ASTMD 1003 – 52
(however, haze value was measured only in case composition of the resin component consists of alkyl methacrylate and alkyl acrylate.)

Each of the test piece was injection moulded at 200°–240° C.

Figure 2:
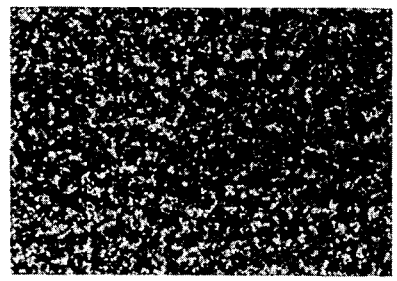
FIG. 2 shows an optical microscope photograph of a cut piece of a shaped article of a resin according to the present invention.

As will be seen in Table 1 – 1, composition of samples obtained herein liked types of photographs FIG. 1 and FIG. 2, the average particle diameter of the rubber component was between 0.3$\mu$ and 0.5$\mu$. The impact strength was very high and the smoothness of the surface of a shaped article was excellent as shown in FIG. 4.

FIG. 1 is an electron microscope photograph (magnification 20,000x), wherein black portions are rubber components. FIG. 2 is an optical microscope photograph (magnification 600x), wherein white portions are rubber components.

When ultraviolent ray was irradiated [irradiation conditions: cycle of water spray (18 (min)/120 (min), black panel temperature (65° C) and indoor temperature (65° C]from a weather-ometer to the test piece obtained by polymerization and injection moulding. Under conditions same as in Example 1 — 1 to check weatherability, when said ray was irradiated for 300 hours, the retaining ratio of the elongation at break was 88 percent which was high. In contrast thereto, in case of a commercially avaiable ABS resin whose rubber component was a butadiene polymer, at an irradiation time of 100 hours, the retaining ratio of the elongation at break was already 19 percent which was low, exhibiting destruction like brittle destruction, from which it was found that the polymer composition of the present invention was apparently excellent in weatherability.

EXAMPLE 2

(Examples 2–1 – 2–14)

Same as the process in Example 1, in 342 g of styrene and 108 g of acrylonitrile, 50 g of one kind each of the activated theylene-vinyl acetate copolymers in said Examples A-7, A-8, A-10, A-11, A-12, A-13, A-14, A-15, A-17, A-18, A-19, A-21, A-22 and A-24 were dissolved, to which mixed solution 0.5 g of tert-dodecyl mercaptan and 0.05 of azobisisobutylonitrile were added and dissolved, and the resultant mixed solution was partially bulk polymerized same as in Example 1. In case of using the respective activated ethylene-vinyl acetate copplymer, the total solid component content when phase inversion took place and the partition ratio at that composition were as shown in Table 2–1. When it was confirmed that phase inversion took place, immediately the polymerization system was cooled by ice water to terminate the polymerization. The so obtained preliminary polymerized syrup was suspension polymerized by the method same as in Example 1. The physical properties of what was obtained by injection moulding the washed and dried obtained suspension polymers. The result of observation by an electron microscope of the ultra thin section and the surface smoothness of the injection moulded pieces were shown in Table 2—2.

The results showed that the surface smoothness of the moulded particles was good and high impact strengths. As shown in Table 2-1, it was understood that the partition ratios were lower than 1.18 and phase inversion took place at the total solid component contents which were low in spite of high content of the rubber component.

TABLE 2-1

| Example | Activated ethylene vinyl ester copolymer used | Partition Ratio | Total solid component content at which phase inversion took place (%) |
|---|---|---|---|
| 2-1 | A-7 | 1.02 | 24.3 |
| 2-2 | A-8 | 1.02 | 25.4 |
| 2-3 | A-10 | 1.01 | 24.3 |
| 2-3 | A-11 | 1.02 | 24.6 |
| 2-5 | A-12 | 1.02 | 25.2 |
| 2-6 | A-13 | 1.00 | 24.8 |
| 2-7 | A-14 | 1.02 | 23.9 |
| 2-8 | A-15 | 1.01 | 23.7 |
| 2-9 | A-17 | 0.85 | 21.3 |
| 2-10 | A-18 | 0.86 | 22.5 |
| 2-11 | A-19 | 0.86 | 24.2 |
| 2-12 | A-21 | 0.84 | 22.1 |
| 2-13 | A-22 | 0.87 | 22.6 |
| 2-14 | A-24 | 0.46 | 19.8 |

EXAMPLE 3

(Examples 3-1 – 3—3)

Into a 1 liter flask provided with a cooling pipe, a thermometer, a nitrogen inlet and a stirring device, 225 g of one kind each of the activated theylene-vinyl acetate copolymers solution obtained in said Examples A-1, A-3 and A-4 was charged, to which 177 g of styrene and 98 g of acrylonitrile were added and dissolved with stirring at 76° C. When they were uniformly dissolved, the mixed solution was partially bulk polymerized by the method same as that mentioned in Example 1. Each of them started phase inversion at the total solid component contents of 23 – 26 percent, therefore, immediately the polymerization systems were cooled by ice water to terminate the polymerization.

The partition ratios at these compositions of polymerization were 1.12 – 1.13. The so obtained preliminary polymerized syrups were suspension polymerized and after-treated by the method same as in Example 1 and the obtained polymers were injection moulded. the physical properties of these injection moulded pieces, the results of observation by an electron microscope of the ultra thin section and the surface smoothness of the injection moulded pieces were shown in Table 3.

As will be seen from Table 3, the average particle diameters of the rubber components of the obtained polymer compositions were about .0.4μ, impact strengths were high and the surface smoothness of the moulded particles was excellent.

EXAMPLE 4

(Examples 4-1 – 4-14)

Same as in Example 3, in 154 g of styrene and 96 g of acrylonitrile, 250 g of one kind each of the activated ethylene-vinyl acetate copolymers solution obtained in said Examples A-7, A-8, A-10, A-11, A-12, A-13, A-14, A-15, A-17, A-18, A-19, A-21, A-22 and A-24 were dissolved, to which mixed solutions, 0.5 g of tert-dodecyl mercaptane and 0.05 g of azobisisobutylonitrile were added and dissolved, and the resultant mixed solutions were partially bulk polymerized same as in Example 1. The total solid component contents at which phase inversion took place and the partition ratios at that compositions in case of using the respective activated ethylene-vinyl acetate copolymers were as shown in Table 4-1. As soon as it was confirmed that phase inversion took place, the polymerization systems were cooled by ice water to terminate the polymerization. The so obtained preliminary polymerized syrups were suspension polymerized and after-treated by the method same as in Example 1 and the obtained polymers were injected moulded. The physical properties of these injection moulded pieces, the results of observation by an electron microscope and the surface smoothness of the injection moulded pieces were shown in Table 4-2.

The results showed that the moulded articles had good surface smoothness and high impact strengths.

As shown in Table 4-1, the partition ratios were lower than 1.18 and phase inversion took place at low total solid component contents as compared with the high rubber component contents.

TABLE 4-1

| Example | Solution of activated ethylene-vinyl ester copolymer used | Partition Ratio | Total solid component content at which phase inversion took place (%) |
|---|---|---|---|
| 4-1 | A-7 | 1.04 | 25.2 |
| 4-2 | A-8 | 1.03 | 25.4 |
| 4-3 | A-10 | 1.03 | 24.6 |
| 4-4 | A-11 | 1.04 | 24.6 |
| 4-5 | A-12 | 1.03 | 25.9 |
| 4-6 | A-13 | 1.03 | 25.8 |
| 4-7 | A-14 | 1.05 | 26.2 |
| 4-8 | A-15 | 1.04 | 24.8 |
| 4-9 | A-17 | 0.88 | 23.1 |
| 4-10 | A-18 | 0.89 | 24.0 |
| 4-11 | A-19 | 0.88 | 25.3 |
| 4-12 | A-21 | 0.86 | 22.8 |
| 4-13 | A-22 | 0.88 | 21.9 |
| 4-14 | A-24 | 0.80 | 21.2 |

EXAMPLE 5

(Examples 5-1 – 5-8)

Same as in Example 1, in a mixture of 410 g of methyl methacrylate and 45 g of methyl acrylate, 45 g of one kind each of the activated ethylene-vinyl acetate copolymers obtained in said Examples A-7, A-8, A-10, A-11, A-12, A-13, A-14 and A-15 was dissolved, to which mixed solution 2 g of n-dodecyl mercaptane and 0.05 g of azobisisobutylonitrile was added and dissolved, and the resultant mixed solution was partially bulk polymerized same as in Example 1. The total solid component contents at which phase inversion took place and the partition ratios in cases of using the respective activated ethylene-vinyl acetate copolymers were as shown in Table 5-1. As soon as it was confirmed that phase inversion took place, the polymerization system was cooled by ice water to terminate the polymerization. The so obtained preliminary polymerized syrups were suspension polymerized and after-treated same as in Example 1, and the obtained polymers were injection moulded. The physical properties of these injection moulded pieces, the results of observation under an electron microscope and the surface smoothness of the injection moulded material articles were shown in Table 5-2. Each of these results showed that the surface smoothness of the moulded article was good. In concomitance therewith the transparency of the moulded article was excellent (haze value was low) and a high impact strength. And as shown in Table 5-1, the partition ratios were lower than 1.18, phase inversion took place at low total solid component contents in spite of high contents of the rubber components, and same as in other Examples, the transfer operation to the step of suspension polymerizations and the suspension polymerizations were very easy.

TABLE 5-1

| Ex. | Activated ethylene-vinyl ester copolymer used | Partition Ratio | total solid component content at which phase inversion took place (%) |
|---|---|---|---|
| 5-1 | A-7 | 1.14 | 28.3 |
| 5-2 | A-8 | 1.13 | 29.1 |
| 5-3 | A-10 | 1.13 | 26.5 |
| 5-4 | A-11 | 1.14 | 27.6 |
| 5-5 | A-12 | 1.14 | 28.1 |
| 5-6 | A-13 | 1.13 | 27.6 |
| 5-7 | A-14 | 1.14 | 29.5 |
| 5-8 | A-15 | 1.15 | 29.1 |

REFERENTIAL EXAMPLE 1

In said Example 1, except using as an activated ethylene-vinyl acetate one kind each of A-2, A-6, A-16, A-23, B-1 and C-1, partial bulk polymerization and suspension polymerization were carried out under conditions same as in Example 1. The obtained polymers were injection moulded. When the internal structures of the so obtained injection moulded pieces were observed under an electron microscope, all the rubber particle diameters were about 6μ which was large. When the impact strengths of these injection moulded pieces were measured, they were within the range of 2.2 - 2.8 kg cm/cm of notch. As such their impact strengths were low as compared with those of the injection moulded pieces obtained in Examples 1 and 2. Moreover, the surfaces of the injection moulded pieces were remarkably rough, being inferior in surface smoothness and said pieces had no luster.

As will be seen from this, when an activated ethylene-vinyl acetate copolymer whose amount of a double bond was less than 0.04 millimol/g was used, it was known that the moulded article was inferior especially in respect of surface smoothness.

REFERENTIAL EXAMPLE 2

When Example 1 was repeated except using as an activated ethylene-vinyl acetate copolymer, one kind each of A-5, A-9, A-20, A-25, B-4 and C-4, in each case at the stage of partial bulk polymerization at an early stage of polymerization, the entire polymerization system gelated, from which it was known that an activated ethylene-vinyl acetate copolymer containing methacrylic group

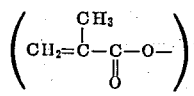

in an amount of above 0.25 millimol per gram of weight of the graft activated ethylene-vinyl acetate copolymer was entirely unsuitable in the preparation of the objective weatherable, impact resistant thermoplastic resin in the present invention.

REFERENTIAL EXAMPLE 3

When partial bulk polymerization was carried out under conditions same as in Example 1 except using A-28 as an activated ethylene-vinyl acetate polymer in Example 1, phase inversion did not take place when the total solid component content became 35 percent. Moreover, at the solid component content of 35 percent, the viscosity in the polymerization system was too high to continue preliminary polymerization with stirring. Because of this, inevitably when the polymerization system was tried to be cooled by ice water to terminate the polymerization, because a continuous phase was a monomer solution phase of the activated ethylene-vinyl acetate copolymer is solidified in a state like agaragar. Therefore, the temperature was made 60° C. Thereafter same as the process mentioned in Example 1, 1.75 g of azobisisobutylonitrile was added to and dissolved in the partially polymerized syrup and said syrup was suspension polymerized. When the obtained polymer composition was washed and dried by a method same as in Example 1 and injection moulded, the surface of the moulded article was very rough. When the internal structure of said article was observed under an electron microscope, the rubber component did not form a clear particulate dispersed phase and the impact strength was 3.4 kg cm/cm of notch which was low. It was confirmed that the partition ratio of composition of the polymer was 1.30, from which it was known that in case of an activated ethylene-vinyl acetate copolymer obtained from an ethylene-vinyl acetate copolymer whose content of vinyl acetate being above 30 percent and the partition ratio being above 1.18, in order to cause phase inversion the total solid component content should be made very high as compared with the present invention and it was not suitable for obtaining a polymer composition having a high impact strength by raising the content of the rubber component.

REFERENTIAL EXAMPLE 4

Example 1 was repeated except using 25 g of A-28 as an activated ethylene-vinyl acetate copolymer and using 361 g of styrene and 114 g of acrylonitrile as monomers in carrying out partial bulk polymerization. About 7 hours after commencement of the polymerization when the solid component content became 26 percent phase inversion took place. Therefore, the polymerization system was cooled by ice water to terminate the polymerization. It was known that despite the content of the rubber component was about one-half of that of Example 1, the total solid component content at which phase inversion took place had to be made about the same as that of Example 1 and it was not possible to originally increase the rubber component. The so obtained preliminary polymerized syrup was suspension polymerized by a method the same as in Example 1. When the obtained polymer composition was washed and dried and then injection moulded, the surface smoothness of the shaped article was good. However, the impact strength was 3.3 kg cm/cm of notch. When the internal structure of the moulded article was observed under an electron microscope, the particle diameter of the rubber component was about 0.2μ. The partition ratio at this composition of the polymer was the same as the case of Referential Example 2, 1.30. It was known that in case of using an activated ethylene-vinyl acetate copolymer obtained from an ethylene-vinyl acetate copolymer containing above 30 percent of vinyl acetate and the partition ratio at the polymerization composition was above 1.18, it was not possible to obtain a polymer having a high impact strength by raising the content of the rubber component as compared with the present invention.

REFERENTIAL EXAMPLE 5

In a 1 liter autoclave provided with a stirring device and a thermometer, 35 g of A-26 mentioned in Example A, 325 g of styrene and 140 g of acrylonitrile were charged, air inside the autoclave was replaced by nitrogen. Thereafter the internal temperature was raised to 70° C and A-26 was dissolved with stirring in 1 hour. Thereafter 0.2 g of di-tert-butyl peroxide, 0.175 g of tert-butyl peracetate and 0.25 g of tert-dodecyl mercaptane were charged in the autoclave, air inside the autoclave was again replaced by nitrogen. The internal temperature was raised to 95° C and polymerization was initiated with stirring at a speed of about 300 r.p.m. 2.5 hours after commencement of the polymerization, the total solid component content in the partially polymerized syrup was 36.4 percent, yet phase inversion did not take place. Moreover, the viscosity of the partial polymer was very high and it became difficult to carry out preliminary bulk polymerization with stirring. Therefore, the said partially polymerized syrup was cooled by ice water and tried to be transferred to the step of suspension polymerization. However, because of the viscosity of the said partially polymerized syrup was high, the partially polymerized syrup could not be dispersed in a water phase for suspension polymerization and it was not possible to carry out suspension polymerization. The partition ratio at this composition of polymerization was 1.25. As such, polymerization composition was such that the partition ratio was above 1.18 and a polymerization initiator having high decomposition temperature and cross-linking property for polymer was used. Even when the rubber content was seven parts, which were low, phase inversion was unlikely to take place when polymerization was carried out to an extent where the total solid component content was considerably high in preliminary polymerization, especially it became difficult to increase the rubber component content. Accordingly, a resin having a high impact strength was difficult to obtain.

REFERENTIAL EXAMPLE 6

When Example 1 was repeated except using A-3 as an activated ethylene-vinyl acetate copolymer and using 387 g of styrene and 68 g of acrylonitrile instead of 346 g of styrene and 109 g of acrylonitrile in carrying out partial bulk polymerization, in this case also same as in Referential Example 3, when the solid component content became 35 percent, phase inversion did not take place. Moreover, the viscosity in the polymerization system became extremely high and it became impossible to continue the preliminary polymerization. Inevitably, when the polymerization system was cooled by ice water, same as in Referential Example 3, the system solidified in a state of agaragar. When this solidified polymerization system was suspension polymerized by a method the same as in Referential Example 3, and when the obtained polymer composition was washed and dried, thereafter injection moulded the same as in the case of Referential Example 1, the surface smoothness of the shaped article was poor and the impact strength was 3.1 kg cm/cm of notch which was low. When the internal structure of the moulded article was investigated under an electron microscope, the rubber component did not form a clear particulate dispersed phase. When the partition ratio of this polymer composition was measured, it was 1.26, from which it was known that even when the rubber component activating an ethylene-vinyl acetate copolymer containing less than 30 percent of vinyl acetate was used, with polymerization composition whose partition ratio was above 1.18, in order to cause phase inversion, the total solid component content had to be made very high as compared with the present invention and it was difficult to obtain a polymer composition having a high impact strength by raising the content of the rubber component.

REFERENTIAL EXAMPLE 7

Example 1 was repeated except using 25 g of A-3 as an activated ethylene-vinyl acetate copolymer and using as monomer 404 g of styrene and 71 g of acrylonitrile in carrying out partial bulk polymerization. As a result, despite the fact that the content of the rubber component became very low, phase inversion did not take place until the solid component content became 25 percent. Moreover, the viscosity of the preliminary polymerized syrup after phase inversion was 662 poise (23° C) which was very high. Because of this, upon dissolving 1.75 g of azobisisobutylonitrile in the syrup by a method the same as in Exmaple 1, the stirring operation was very difficult to carry out. When it was tried to suspension polymerize said syrup, because the viscosity of the syrup was high, it was not suspended well and by raising a stirring frequency it was finally suspended somehow. When the obtained suspension polymer was washed and dried, and thereafter injection moulded, the surface smoothness of the obtained moulded article was good. However, the impact strength was 3.8 kg cm/cm of notch which was low. The partition ratio of this polymerization composition was 1.26, from which it was known that in such case even if the content of the rubber component was made low, to make low the total solid component content at which phase inversion took place, unless essentially the total solid component content was made considerably high, phase inversion did not take place. The viscosity of the system became high and polymerization operation was difficult to carry out, and because the content of the rubber component was low, the impact strength was low and that such case was inferior in every aspect as compared with the process of the present invention.

REFERENTIAL EXAMPLE 8

In a 1 liter flask the same as that used in Example 1, 45 g of A-10, the activated ethylene-vinyl acetate copolymer obtained in said Example A, was dissolved in a monomer mixture of 346 g styrene and 109 g of acrylonitrile. Next, 1.5 g of n-dodecyl mercaptane and 0.05 g of azobisisobutylonitrile were added to and dissolved in the mixed solution. Nitrogen gas was passed into the flask. The temperature was fixed at 73° C at 100 r.p.m. to initiate partial bulk polymerization. Because it was confirmed that when the total solid component content became about 26 percent, phase inversion of this preliminary polymer syrup took place. The polymerization system was cooled by ice water to terminate the polymerization.

On the other hand, in a 2 liter flask the same as that in Example 1, a water phase for suspension polymerization was prepared in which what was obtained by adding to and dissolving in said preliminary polymerized syrup, 1.75 g of azobisisobutylonitrile was added and the mixture was suspension polymerized by a method the same as in Example 1. The obtained polymer composition was filtered, washed and dried. Thereafter it was injection moulded. The physical properties of the so obtained injection moulded piece and the results of observation under an optical microscope of the ultra thin section were as shown in Table 14.

Figure 3:
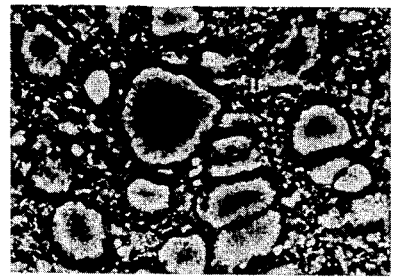
FIG. 3 shows an optical microscope photograph of a cut piece of a shaped article of a resin whose rubber component has a particle diameter of above 3 microns.

The optical microscope photograph was the same as FIG. 3 (magnification 600 x, wherein white portions were rubber) and the scanning microscope photograph of the surface of the moulded piece was the same as in FIG. 5. Namely, it was known that in case the number average particle diameter of the rubber component was above $3\mu$, the surface of the moulded article was rough and surface luster disappeared and one characteristic as the plastic material was lost.

REFERENTIAL EXAMPLE 9

Example 5 was repeated except using 45 g of A-6 as an activated ethylene-vinyl acetate copolymer in carrying out partial bulk polymerization. The total solid component content at which phase inversion took place was 27.9 percent. Continuously, the preliminary polymerized syrup was suspension polymerized and after-treated the same as in Example 1, and the obtained polymer was injection moulded. The surface of the injection moulded piece was very rough. Transparency was greatly impaired and the haze value was 51 which was large. The physical properties of the obtained sample and the results of observation under an electron microscope of the ultra thin section were shown in Table 15. The rubber particle diameter was about $4\mu$ which was large. As will be seen from this result, it was known that when polymerization conditions resulting in a large diameter of the rubber particle were adopted, the surface smoothness of the moulded article became very bad and the surface luster disappeared and as in the case of this Referential Example concerning a transparent resin, a cloud value became so large as to almost lose practical transparent feeling.

REFERENTIAL EXAMPLE 10

When Example 2 was repeated using A-24 as an activated ethylene-vinyl acetate copolymer, except using 423 g of styrene and 27 g of acrylonitrile instead of 342 g of styrene and 108 g of acrylonitrile in carrying out partial bulk polymerization, phase inversion took place at the total solid component content of 27 percent. Therefore, the polymerization system was cooled by ice water to terminate the polymerization. The so obtained preliminary polymerized syrup was suspension polymerized by a method the same as in Example 1. The obtained suspension polymer was washed and dried and thereafter injection moulded. The surface smoothness of the moulded article was fairly good. However, the impact strength was 3.2 kg cm/cm of notch which was low. The average particle diameter of the rubber component was about $1\mu$. The distribution ratio at this polymerization composition was 1.16 or within the range of the present invention. From the foregoing, it became apparent that when composition of the resin component was such that the gross total of a 3.5 time amount of percent by weight of acrylonitrile and percent by weight of alkyl methacrylate (wherein alkyl group has one to three carbon atoms) in monomer mixture was below 25 percent, at least within the conditions making good the surface smoothness of the shaped article, the impact strength became low.

REFERENTIAL EXAMPLE 11

Example 2 was repeated using A-4 as an activated ethylene-vinyl acetate copolymer, except using 329 g of methyl methacrylate and 121 g of acrylonitrile instead of 342 g of styrene and 108 g of acrylonitrile in carrying out partial bulk polymerization. As a result, because phase inversion took place at the total solid component content of 17 percent, the polymerization system was cooled by ice water to terminate the polymerization. The obtained preliminary polymerized syrup was suspension polymerized by a method the same as in Example 1. The obtained suspension polymer was washed and dried, and when it was thereafter injection moulded, the melt viscosity was remarkably high and the processability of the polymer was poor. In addition, the moulded article was discolored in yellowish brown. The partition ratio of this polymerization composition was 0.7, being within the range of the present invention. From the foregoing, it became apparent that when composition of the resin component was such that the gross total of a 3.5-time amount of percent by weight of acrylonitrile and percent of alkyl methacrylate (wherein the alkyl group has one to three carbon atoms) in monomer mixture was above 150 percent. There were defects that the processability of the obtained polymer was poor and said polymer tended to be discolored in yellowish brown, it being not preferable.

REFERENTIAL EXAMPLE 12

Example 1 was repeated using 25 g of A-4 as an activated ethylene-vinyl acetate copolymer, except using 361 g of styrene, 114 g of acrylonitrile and 0.05 g of tert-dodecyl mercaptane in carrying out partial bulk polymerization and suspension polymerization. When the obtained polymer composition was injection moulded, the surface smoothness and the surface luster of the moulded article were good. However, an izod impact strength was 2.4 kg cm/cm of notch which was low and the moulded article was inferior to that of Example 1. When the degree of grafting of this polymer composition was measured, it was 547 percent. When the ultra thin section was observed under an electron microscope to measure the particle diameter, it was about $0.07\mu$ which was low. From the foregoing, it was known that in case polymerization conditions resulting in the degree of grafting of over 500 percent were adopted, the particle diameter of the rubber component became extremely small, and the surface smoothness of the injection moulded article of the obtained polymer composition was good, but the impact strength was inferior, it being not preferable.

REFERENTIAL EXAMPLE 13

EXample 1 was repeated except using 45 g of A-10 as an activated ethylene-vinyl acetate copolymer and using 346 g of styrene, 109 g of acrylonitrile and 3.0 g of tert-dodecyl mercaptane in carrying out partial bulk polymerization and suspension polymerization. When the obtained polymer composition was injection moulded the surface smoothness of the moulded article was remarkably poor and there was no luster at all. The izod impact strength of the projection shaped article was 3.1 kg cm/cm of notch, being low and inferior.

When the degree of grafting of this polymer composition was measured, it was 17 percent, from which it was known that when such polymerization conditions as mentioned above resulting in the degree of grafting of below 20 percent was adopted, the surface smoothness and the impact strength of the obtained polymer composition were low, it being not preferable.

EXAMPLE 6

(Examples 6–1 – 6–5)

Example 4 was repeated except using 250 g of B-2, B-3, B-5, B-6 and B-7 as activated ethylene-vinyl acetate copolymer solution. The partition ratios of this polymerization compositions and the total solid component contents at which phase inversion took place were as shown in Table 6–1.

(EXAMPLE 6–6)

Example 2 was repeated using 35 g of B-6 as an activated ethylene-vinyl acetate copolymer, except using 407 g of styrene and 58 g of acrylonitrile instead of 342 g of styrene and 108 g of acrylonitrile. The partition ratio of this polymerization composition was 1.12 and the total solid component content at which phase inversion took place was 18.9 percent.

TABLE 6-1

| Example | Solution of activated ethylene-vinyl acetate copolymer used | Partition Ratio | Total solid component content at which phase inversion took place |
|---|---|---|---|
| 6-1 | B-2 | 0.90 | 24.1 |
| 6-2 | B-3 | 0.89 | 23.6 |
| 6-3 | B-5 | 0.86 | 22.9 |
| 6-4 | B-6 | 0.88 | 23.8 |
| 6-5 | B-7 | 0.89 | 23.7 |

The physical properties of the obtained samples and the results of observation under an electron microscope were as shown in Table 6–2, wherein in each case the properties like the surface smoothness and the impact strength were excellent.

EXAMPLE 7

(Examples 7–1 – 7–2)

Example 2 was repeated except using 55 g of B-2 or B-5, 275 g of styrene, 125 g of acrylonitrile, 45 g of methacrylonitrile and 0.75 g of tert-dodecyl mercaptan instead of 50 g of the activated ethylene-vinyl acetate copolymer, 342 g of styrene, 108 g of acrylonitrile and 0.5 g of tert-dodecyl metcaptan. The partition ratios at this polymerization compositions were 0.80 and 0.62 and the total solid composition contents at which phase inversion took place were 21.8 and 22.0 respectively. The physical properties of the obtained samples and the results of observation under an electron microscope were as shown in Table 7, wherein each of the moulded articles was excellent in properties such as surface smoothness and impact strength.

EXAMPLE 8

(Examples 8–1 – 8–2)

Example 2 was repeated except using 50 g of C-2 and C-3 as an activated ethylene-vinyl acetate copolymer. The partition ratios at this polymerization compositions were 1.04 and 1.06 and the total solid component contents at which phase inversion took place were 25.7 percent and 26.0 percent, respectively.

(EXAMPLES 8–3 – 8–4)

Example 2 was repeated except using 45 g of C-2 or C-3 as the activated ethylene-vinyl acetate copolymer and using 410 g of methyl methacrylate and 45 g of methyl acrylate instead of 346 g of styrene and 108 g of acrylonitrile.

The partition ratios at this polymerization compositions were 1.13 and 1.14 and the total solid component contents at which phase inversion took place were 24.8 percent and 25.0 percent, respectively.

The physical properties of the obtained samples and the result of observation under an electron microscope were as shown in Table 8, wherein each of the moulded articles was excellent in properties like surface smoothness and impact strength.

EXAMPLE 9

(Examples 9–1 – 9–6)

Example 1 was repeated using 45 g of D-1, D-2, D-3, D-4, D-5 and D-6 as the activated ethylene-vinyl acetate copolymer. The partition ratios at this polymerization compositions and the total solid component contents at which phase inversion took place were as shown in Table 9–1.

(Example 9–7)

Example 2 was repeated except using 20 g of D-3 as the activated ethylene-vinyl acetate copolymer and using 336 g of methyl methacrylate and 144 g of styrene instead of 342 g of styrene and 108 g of acrylonitrile. The partition ratio at this polymerization composition was 0.94 and the total solid component content at which phase inversion took place was 12 percent.

TABLE 9-1

| Example | Activated ethylene-vinyl ester copolymer used | Partition ration | Total solid component content at which phase inversion took place |
|---|---|---|---|
| 9-1 | D-1 | 1.14 | 26.0 |
| 9-2 | D-2 | 1.05 | 23.1 |
| 9-3 | D-3 | 0.88 | 20.6 |
| 9-4 | D-4 | 0.90 | 21.2 |
| 9-5 | D-5 | 0.90 | 21.4 |
| 9-6 | D-6 | 0.91 | 21.8 |

(Example 9–8)

Example 2 was repeated except using 60 g of D-4 as the activated ethylene-vinyl acetate copolymer and using 308 g of styrene and 132 g of acrylonitrile instead of 342 g of styrene and 108 g of acrylonitrile. The partition ratio at this polymerization composition was 0.75 and the total solid component content at which phase inversion took place was 26 percent.

The physical properties of the obtained samples and the results of observation under an electron microscope were as shown in Table 9–2, wherein each of the samples was excellent in properties like surface smoothness and impact strength.

EXAMPLE 10

(Examples 10–1 – 10–2)

By a method the same as in Example 1, 45 g of activated ethylene-vinyl acetate copolymers E-1 and E-2 were dissolved in a mixture of 410 g of methyl methacrylate and 45 g of ethyl acrylate, to which solution 2 g of n-dodecyl mercaptane and 0.1 g of lauroyl peroxide were added and dissolved. The mixed solution was partially bulk polymerized by a method the same as in Example 1. Because at the total solid component contents of 28.0 percent and 28.3 percent, phase inverstion took place, the polymerization system was cooled by ice water to terminate the polymerization. The partition ratios at this polymerization compositions were 1.04 and 1.05. The so obtained preliminary polymerized syrups were each added with 2.5 g of lauroyl peroxide which was dissolved in the syrups. Thereafter by a method the same as in Example 1, polymer compositions were obtained. The physical properties of the so obtained polymer compositions and the results of observation under an electron microscope were as shown in Table 10, wherein each of them was excellent in properties in respect of surface smoothness and impact strength.

EXAMPLE 11

(Examples 11-1 – 11-2)

By a method the same as in Example 2, 50 g of activated ethylene-vinyl acetate-vinyl alcohol copolymers, F and G were dissolved in a mixture of 90 g of styrene, 270 g of methyl methacrylate and 90 g of acrylonitrile, to which solution 1 g of n-dodecyl mercaptan and 0.1 g of azobisisobutylonitrile were added and dissolved therein, and the mixed solutions were partially bulk polymerized by method the same as in Example 1. Said mixed solutions started phase inversion at the total solid component contents of 16 percent and 17.1 percent, respectively. The partition ratios at this polymerization compositions were 0.74 and 0.75, respectively. To the so obtained preliminary polymerized syrups, 1.75 g of azobisisobutyronitrile was added, and thereafter by a method the same as in Example 1, polymer compositions were obtained. The physical properties of the so obtained compositions and the results of observation under an electron microscope were as shown in Table 11, wherein each of these moulded articles was excellent in surface smoothness and impact strength.

EXAMPLE 12

Into a 2 liter flask provided with a cooling pipe, a thermometer, a nitrogen inlet and a stirring device, 90 g of B-5, the activated ethylene-vinyl acetate copolymer mentioned in Example B was charged, to which 692 g of styrene and 218 g of acrylonitrile were added. The temperature was made 70° C to well dissolve the copolymer, to which solution 0.5 g of tert-dodecyl mercaptan and 0.1 g of azobisisobutylonitrile were added. R.p.m. of the stirring device was made 230 – 280 times/minute, the temperature was fixed at 73° C and while passing nitrogen into the reaction system, partial bulk polymerization was started. About 4.5 hours after addition of the polymerization initiators when the total solid component content became 20.9 percent, because it could be confirmed that phase inversion took place, the polymerization system was cooled by ice water to terminate the polymerization. The partition ratio at this polymerization composition was 0.90. To the preliminary polymerized syrup obtained by the above process, 3.5 g of azobisisobutylonitrile and 1 g of azobiscyclohexanenitrile were added and well stirred at room temperature to apparently uniformly dissolve them in said syrup.

On the other hand in a 5 liter autoclave, 2 liters of a water phase for suspension polymerization mentioned in Example 1 was prepared, to which said preliminary polymerized syrup dissolving said polymerization initiators was added. The temperature was made 50° C with stirring to start suspension polymerization. The temperature condition of the suspension polymerization was to elevate the temperature from 50° C to 70° C in 1 hour, elevate the temperature from 70° C to 80° C in 1.0 hour and elevate the temperature from 80° C to 115° C in 30 minutes and polymerization was carried out at 115° C for 3 hours to complete the polymerization. The obtained suspension polymer composition was filtered, washed and dried. A part of the obtained polymer solution was injection moulded (Example 12-1). With the remaining polymer composition, polymethylmethacrylate, sold by Toyo Rayon Kabushiki Kaisha ("Tarex-HR") and a styrene-acrylonitrile copolymer sold by Asahi Dow Co., Ltd. ("Tyril 780") were blended at compositions shown in Table 12-1 using a hot roll at 150° – 160° C to prepare sheets, which were cut into pellets. Said pellets were injection moulded (Example 12-2 and Example 12-3). The properties of the injection moulded pieces obtained as a result and the results of observation under an electron microscope of ultra thin section were as shown in Table 12-2, wherein each of the three was excellent in properties such as surface smoothness and impact strength of the moulded article.

TABLE 12-1

| Example | Blending ratio (polymerization ratio) |
|---|---|
| 12-1 | Non-blended |
| 12-2 | The polymer composition of Example 12/ polymethylmethacrylate = 1/1 |
| 12-3 | The pilymer composition of Example 12/ styrene-acrylonitrile copolymer = 1/1 |

EXAMPLE 13

In about 1 kg of a preliminary polymerized syrup obtained by a method the same as in Example 12, 1 g of azobisisobutylonitrile and 3.5 g of azobiscyclohexane nitrile were dissolved. About 100 g of the obtained solution was poured into a 200 cc test tube. At a part of said tube a cooling pipe and a nitrogen inlet were provided. Said tube was immersed in a silicone oil bath, which was kept at 73° C for 2 hours. The temperature was raised to 90° C in 30 minutes, kept at 90° C for 1 hour, the temperature was raised to 130° C in 30 minutes, kept at 130° C for 3 hours, the temperature was raised to 150° C in 30 minutes, kept at 150° C for 4 hours, the temperature was raised to 200° C in 30 minutes and kept at 200° C for 1 hour. In such a way the bath was heated to complete polymerization. Next, the test tube was taken out from the silicone oil bath. The test tube was destroyed to take out the polymer composition inside, which compositions were collected and mixed by a hot roll at 150° C – 160° C to make a sheet, which was cut into pellets, which were injection moulded. The physical properties of the so obtained injection moulded piece and the results of observation under an electron microscope of the ultra thin section were as shown in Table 13, wherein the properties such as surface smoothness and impact strength of the injection moulded piece were excellent.

TABLE 1

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 1-1 | A-1 | 0.092 | 7.6 | 500 | 44 | 0.4 | | 0 | 192 | 26.3 | 73.7 |
| 1-2 | A-3 | 0.103 | 6.9 | 510 | 37 | 0.3 | | 0 | 220 | 28.8 | 71.2 |
| 1-3 | A-4 | 0.164 | 7.1 | 490 | 52 | 0.5 | | 0 | 236 | 30.2 | 69.8 |

TABLE 2-2

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 2-1 | A-7 | 0.111 | 7.3 | 490 | 31 | 0.6 | | 0 | 162 | 26.2 | 73.8 |
| 2-2 | A-8 | 0.185 | 8.5 | 500 | 48 | 0.3 | | 0 | 234 | 33.4 | 60.6 |
| 2-3 | A-10 | 0.089 | 7.4 | 480 | 49 | 0.7 | | 0 | 154 | 25.4 | 74.6 |
| 2-4 | A-11 | 0.124 | 9.4 | 470 | 52 | 0.4 | | 0 | 175 | 27.5 | 72.5 |
| 2-5 | A-12 | 0.131 | 8.1 | 480 | 45 | 0.5 | | 0 | 186 | 28.6 | 71.4 |
| 2-6 | A-13 | 0.095 | 7.5 | 490 | 43 | 0.5 | | 0 | 159 | 25.9 | 74.1 |
| 2-7 | A-14 | 0.100 | 9.2 | 470 | 46 | 0.4 | | 0 | 159 | 25.9 | 74.1 |
| 2-8 | A-15 | 0.107 | 6.7 | 470 | 40 | 0.3 | | 0 | 160 | 26.0 | 74.0 |
| 2-9 | A-17 | 0.085 | 9.8 | 460 | 57 | 0.7 | | 0 | 128 | 22.8 | 77.2 |
| 2-10 | A-18 | 0.126 | 10.1 | 490 | 41 | 0.4 | | 0 | 154 | 25.4 | 74.6 |
| 2-11 | A-19 | 0.199 | 10.4 | 500 | 36 | 0.4 | | 0 | 220 | 21.3 | 68.0 |
| 2-12 | A-21 | 0.078 | 9.7 | 470 | 45 | 0.8 | | 0 | 113 | 21.3 | 78.7 |
| 2-13 | A-22 | 0.120 | 10.0 | 460 | 53 | 0.6 | | 0 | 150 | 25.0 | 75.0 |
| 2-14 | A-24 | 0.103 | 8.3 | 470 | 54 | 1.0 | | 0 | 121 | 22.1 | 77.9 |

TABLE 3

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 3-1 | A-1 | 0.092 | 7.2 | 500 | 33 | 0.4 | | 0 | 174 | 24.7 | 75.3 |
| 3-2 | A-3 | 0.103 | 7.5 | 510 | 39 | 0.4 | | 0 | 190 | 26.1 | 73.9 |
| 3-3 | A-4 | 0.164 | 6.6 | 480 | 47 | 0.4 | | 0 | 210 | 27.9 | 72.1 |

TABLE 4-2

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 4-1 | A-7 | 0.111 | 7.8 | 460 | 64 | 0.6 | | 0 | 145 | 24.5 | 75.5 |
| 4-2 | A-8 | 0.185 | 8.4 | 500 | 53 | 0.4 | | 0 | 212 | 31.2 | 68.8 |
| 4-3 | A-10 | 0.089 | 8.1 | 500 | 48 | 0.7 | | 0 | 141 | 24.1 | 75.9 |
| 4-4 | A-11 | 0.124 | 7.6 | 490 | 48 | 0.4 | | 0 | 152 | 25.2 | 74.8 |
| 4-5 | A-12 | 0.131 | 7.9 | 490 | 56 | 0.5 | | 0 | 162 | 26.2 | 73.8 |
| 4-6 | A-13 | 0.095 | 7.5 | 500 | 42 | 0.4 | | 0 | 134 | 23.4 | 76.6 |
| 4-7 | A-14 | 0.100 | 9.0 | 480 | 51 | 0.4 | | 0 | 138 | 23.8 | 76.2 |
| 4-8 | A-15 | 0.107 | 8.4 | 480 | 50 | 0.3 | | 0 | 136 | 23.6 | 76.4 |
| 4-9 | A-17 | 0.085 | 8.7 | 460 | 58 | 0.8 | | 0 | 100 | 20.0 | 80.0 |
| 4-10 | A-18 | 0.126 | 9.0 | 510 | 62 | 0.5 | | 0 | 121 | 22.1 | 77.9 |
| 4-11 | A-19 | 0.199 | 8.2 | 470 | 55 | 0.4 | | 0 | 204 | 30.4 | 69.6 |
| 4-12 | A-21 | 0.078 | 9.9 | 460 | 66 | 0.8 | | 0 | 95 | 19.5 | 80.5 |
| 4-13 | A-22 | 0.120 | 10.3 | 500 | 37 | 0.7 | | 0 | 137 | 23.7 | 76.3 |
| 4-14 | A-24 | 0.103 | 8.8 | 500 | 43 | 1.0 | | 0 | 103 | 20.3 | 79.7 |

TABLE 5-2

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 5-1 | A-7 | 0.111 | 6.1 | 470 | 39 | 0.3 | 13.6 | 0 | 118 | 19.6 | 80.4 |
| 5-2 | A-8 | 0.185 | 5.3 | 470 | 47 | 0.5 | 21.3 | 0 | 159 | 23.3 | 70.7 |
| 5-3 | A-9 | 0.089 | 6.0 | 480 | 68 | 0.5 | 20.6 | 0 | 90 | 17.1 | 82.9 |
| 5-4 | A-11 | 0.124 | 6.2 | 470 | 33 | 0.4 | 16.7 | 0 | 128 | 20.5 | 79.5 |
| 5-5 | A-12 | 0.131 | 5.6 | 460 | 44 | 0.3 | 10.9 | 0 | 132 | 20.9 | 79.1 |
| 5-6 | A-13 | 0.095 | 5.7 | 460 | 50 | 0.4 | 17.2 | 0 | 96 | 17.5 | 82.5 |
| 5-7 | A-14 | 0.100 | 5.3 | 460 | 52 | 0.4 | 14.5 | 0 | 98 | 17.8 | 82.2 |
| 5-8 | A-15 | 0.107 | 5.3 | 490 | 46 | 0.4 | 16.0 | 0 | 114 | 19.3 | 80.7 |

TABLE 6-2

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 6-1 | B-2 | 0.103 | 9.8 | 480 | 42 | 0.6 | | 0 | 111 | 21.1 | 78.9 |
| 6-2 | B-3 | 0.167 | 9.5 | 470 | 54 | 0.4 | | 0 | 182 | 28.2 | 71.8 |
| 6-3 | B-5 | 0.088 | 9.5 | 480 | 50 | 0.6 | | 0 | 109 | 20.9 | 79.1 |
| 6-4 | B-6 | 0.120 | 9.0 | 500 | 48 | 0.4 | | 0 | 117 | 21.7 | 78.3 |
| 6-5 | B-7 | 0.175 | 10.7 | 470 | 54 | 0.7 | | 0 | 190 | 29.0 | 71.0 |
| 6-6 | B-8 | 0.120 | 6.7 | 530 | 35 | 0.8 | | 0 | 110 | 15.1 | 84.9 |

TABLE 7

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 7-1 | B-2 | 0.103 | 11.6 | 450 | 46 | 2.1 | | 0 | 103 | 22.3 | 77.7 |
| 7-2 | B-5 | 0.088 | 12.1 | 460 | 38 | 1.8 | | 0 | 97 | 21.7 | 78.3 |

TABLE 8

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 8-1 | C-2 | 0.118 | 9.3 | 490 | 56 | 0.4 | | 0 | 146 | 24.6 | 75.4 |
| 8-2 | C-3 | 0.191 | 9.1 | 500 | 42 | 0.4 | | 0 | 210 | 21.0 | 69.0 |
| 8-3 | C-2 | 0.118 | 7.4 | 500 | 39 | 0.4 | 17.1 | 0 | 123 | 20.2 | 79.8 |
| 8-4 | C-3 | 0.191 | 7.4 | 500 | 40 | 0.6 | 23.4 | 0 | 176 | 24.8 | 75.2 |

TABLE 13

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 13 | B-5 | 0.088 | 8.9 | 490 | 57 | 0.6 | | 0 | 121 | 19.9 | 80.1 |

TABLE 14

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| Ref. Ex. 8 | A-10 | 0.089 | 6.2 | 420 | 53 | 5 | | X | 106 | 18.5 | 81.5 |

TABLE 15

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| Ref. Ex. 9 | A-6 | 0.013 | 2.1 | 530 | 42 | 4 | 51 | X | 18 | 10.6 | 89.4 |

TABLE 9-2

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 9-1 | D-1 | 0.092 | 6.8 | 510 | 50 | 0.4 | | 0 | 191 | 26.2 | 73.8 |
| 9-2 | D-2 | 0.117 | 7.8 | 500 | 39 | 0.5 | | 0 | 171 | 24.4 | 75.6 |
| 9-3 | D-3 | 0.084 | 9.0 | 500 | 46 | 0.5 | | 0 | 112 | 19.1 | 81.9 |
| 9-4 | D-4 | 0.106 | 9.6 | 490 | 64 | 0.8 | | 0 | 130 | 20.7 | 79.3 |
| 9-5 | D-5 | 0.125 | 9.2 | 520 | 29 | 0.7 | | 0 | 132 | 20.9 | 79.1 |
| 9-6 | D-6 | 0.127 | 8.0 | 480 | 48 | 0.4 | | 0 | 168 | 24.1 | 75.9 |
| 9-7 | D-2 | 0.117 | 4.5 | 560 | 51 | 0.3 | | 0 | 127 | 9.1 | 90.9 |
| 9-8 | D-3 | 0.084 | 12.6 | 430 | 63 | 1.1 | | 0 | 103 | 24.5 | 75.5 |

TABLE 10

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 10-1 | E-1 | 0.080 | 5.7 | 460 | 62 | 0.3 | 12.8 | 0 | 82 | 16.4 | 83.6 |
| 10-2 | E-2 | 0.132 | 6.1 | 480 | 57 | 0.4 | 17.5 | 0 | 136 | 21.2 | 78.8 |

TABLE 11

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 11-1 | F | 0.116 | 9.7 | 490 | 46 | 0.4 | | 0 | 142 | 24.2 | 75.6 |
| 11-2 | G | 0.122 | 10.3 | 500 | 34 | 0.4 | | 9 | 166 | 26.6 | 73.4 |

TABLE 12-2

| Example | Activated ethylene-vinyl ester copolymer or copolymer solution used | Amount of side chain vinyl group introduced into activated ethylene-vinyl ester copolymer used (mmol./g.) | Izod impact strength (kg. cm./cm. of notch) | Tensile strength at yield (kg./cm.²) | Elongation at break, percent | Approximate average particle diameter of the rubber component (μ) | Haze value | Surface smoothness of an injected moulded piece | Percent by weight | | |
|---|---|---|---|---|---|---|---|---|---|---|---|
| | | | | | | | | | Degree of grafting | Amount of a graft polymer | Amount of a hard resin (copolymer) |
| 12-1 | B-5 | 0.088 | 9.4 | 490 | 51 | 0.6 | | 0 | 113 | 19.2 | 80.8 |
| 12-2 | B-5 | 0.088 | 4.2 | 550 | 48 | 0.6 | | 0 | 113 | 9.6 | 90.5 |
| 12-3 | B-5 | 0.088 | 4.6 | 560 | 43 | 0.6 | | 0 | 113 | 9.6 | 90.4 |

The following is claimed:

1. A thermoplastic resin composition consisting essentially of a mixture of about 0.36 – 90 percent by weight of a graft polymer (C) and about 10 – 99.64 percent by weight of a resin component (D), wherein said graft polymer (C) is a copolymer of a monomeric component (A) and a trunk rubber component (B)

wherein said monomeric component (A) is selected from the group consisting of (x) aromatic vinyl compound, (y) alkyl methacrylate wherein the alkyl group has one to three carbon atoms and (z) acrylonitrile and mixtures thereof, the sum of (x) plus (y) plus (z) comprising at least 70 percent by weight of the total weight of monomeric component (A), and the weight of (y) plus 3.5 times the weight of (z) being in the range of 25 – 150 percent of the total weight of said monomeric component (A) and wherein the trunk rubber component (B) is an ethylene-vinyl acetate copolymer having a side chain which includes $CH_2=C(CH_3)COO$—groups in an amount of 0.04 – 0.25 millimoles of said groups per gram of said trunk rubber component (B), and said component (B) contains 5 – 30 percent by weight of vinyl acetate before graft activation, wherein the resin component (D) is the product of polymerizing the monomeric component (A), the weight percent of component (B) being 0.3 – 30 percent by weight of the entire composition, and the copolymerization percentage ratio of (A) to (B) and (D) being in the range of about 0.6 – 1.18, and rubber phase as dispersed into the resin phase having an average particle diameter of 0.1 – 3 microns;

said thermoplastic resin composition being prepared by a process comprising (1) mixing 0.3 to 30 percent by weight of the trunk rubber component (B) with 99.7 to 70 percent by weight of the monomeric component (A) to form said copolymer solution in said monomeric component, (2) partially bulk polymerizing said solution in presence of at least one radical polymerization initiator selected from the group consisting of an azo compound and a peroxide whose decomposition rate constant at 85°C is at least $5 \times 10^{-6}$ sec$^{-1}$ until phase inversion takes place and (3) thereafter polymerizing the obtained product in such manner that no shearing stress is placed on the rubber component.

2. A composition according to claim 1 wherein said aromatic vinyl compound is a compound represented by the general formula

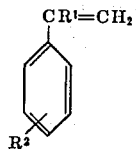

wherein $R^1$ and $R^2$ are selected from the group consisting of hydrogen, methyl group or halogen.

3. A composition according to claim 1 wherein said alkyl methacrylate is methyl methacrylate.

4. A composition according to claim 1 wherein said aromatic vinyl compound is styrene.

5. A composition according to claim 1 wherein said trunk rubber component (B) is a graft activating ethylene-vinyl acetate copolymer having as a part of its side chain $CH_2=C(CH_3)COO$— group in an amount of 0.05 – 0.20 millimole/gram of said trunk rubber component (B).

6. A composition according to claim 1 wherein said trunk rubber component (B) is a graft activating ethylene-vinyl acetate-vinyl alcohol copolymer having as a part of its side chain $CH_2=C(CH_3)COO$— group in an amount of 0.04 – 0.25 millimole per gram of said trunk rubber component (B).

7. A composition according to claim 1 wherein said trunk rubber component (B) is a graft activating ethylene-vinyl acetate-vinyl alcohol copolymer having as a part of its side chain $CH_2 C(CH_3)COO$— group in an amount of 0.05 – 0.20 millimole per gram of said trunk rubber component (B).

8. A composition according to claim 1 wherein the degree of grafting of said graft polymer (C) is 30 – 300 percent by weight.

9. A composition according to claim 1 wherein the ratio of said graft polymer (C) and said polymer (D) is 1 – 85 percent by weight of (C) and 15 – 99 percent by weight of (D).

10. A composition according to claim 1 wherein the content of said trunk resin component (B) in said resin composition is 1 – 20 percent by weight.

11. A composition according to claim 1 wherein said partition ratio of said monomer mixture (A) in said trunk rubber component (B) and said resin component is 0.65 – 1.1.

12. A composition according to claim 1 wherein the average particle diameter of said rubber phase (B) is 0.2 – 2 microns.

13. A process for the preparation of a thermoplastic resin composition which comprises mixing 0.3 – 30 percent by weight of a graft activating ethylene-vinyl acetate copolymer (B) having in its side chain $CH_2=C(CH_3)COO$ groups in an amount of 0.04 to 0.25 millimole/gram with copolymer (B) containing 5 – 30 percent of vinyl acetate before graft activation with 99.7 – 70 percent by weight of radical copolymerizable vinyl component (A) having such composition that the gross total of at least one member selected from the group consisting of (x) an aromatic vinyl compound, (y) alkyl methacrylate wherein the alkyl group has one to three carbon atoms and (z) acrylonitrile comprise at least 70 percent by weight of the total weight of the monomer mixture and the weight of (y) plus 3.5 times the weight of (z) being in the range of 25 to 150 percent of the total weight of said monomeric component, partially bulk polymerizing said solution in presence of at least one radical polymerization initiator selected from the group consisting of an azo compound and a peroxide whose decomposition rate constant at 85°C is at least $5 \times 10^{-6}$ sec$^{-1}$ until phase inversion takes place, and thereafter polymerizing the obtained product in such manner that no shearing stress is placed on the rubber component.

14. A process according to claim 13 wherein said radical polymerization initiator is at least one compound selected from the group consisting of azobisisobutylonitrile, azobis 2 methyl butylonitrile, azobis 2, 3 dimethyl butylonitrile, azobis 2, 3, 3 trimethyl butylonitrile, azobis 2 isopropyl butylonitrile, azobis 2 isopropyl 3 methyl butylonitrile, azobis 2 methyl valeronitrile, azobis 2, 4 dimethyl valeronitrile, azobis 2, 4, 4 trimethyl valeronitrile, azobis 2 isobutyl 4 methyl valeronitrile, azobiscyclopentanenitrile, azobiscyclohexanenitrile, azobiscyclobutanenitrile, azobiscycloheptanenitrile, azobis 2 methyl heptylonitrile, azobis 1 (2 methyl cyclohexane) nitrile, azobiscyclohexanecarbonitrile, azobiscyclooctanenitrile, azobiscyclopropyl propionitrile, azobiscyclopentylpropionitrile, azobiscyclohexyl propionitrile, azobis 2 benzyl propionitrile, azobiscyclodecanenitrile, lauroyl peroxide, heptanoneperoxide, acetyl cyclohexyl sulfonyl peroxide, cyclohexan acetyl peroxide, octanoyl peroxide, decanoyl peroxide, caprylyl peroxide, 5 phenylvarleryl peroxide, benzoyl peroxide, p-chlorobenzoyl peroxide, t-butyl peroxy 2 ethyl hexanoate, acetyl peroxide, succinic acid peroxide, propionyl peroxide, stearoyl peroxide, 3, 5, 5-trimethylhexanoyl peroxide, t-butyl peroxy pivalate, 2, 4 dichlorobenzoyl peroxide, di-2-ethylhexyl peroxy dicarbonate, diisopropyl peroxy dicarbonate, isobutyryl peroxide and t-butyl peroxy isobutylate.

15. The process defined in claim 13, wherein the partial bulk polymerization takes place at a temperature of 40°– 250° C with stirring in the presence of a radical polymerization initiator.

16. The process defined in claim 13, wherein th last-mentioned polymerization takes place as bulk polymerization at a temperature of 30° – 250° C with mild stirring.

17. The process defined in claim 13, wherein the last-mentioned polymerization takes place as bulk polymerization at a temperature of 30° – 250° C without stirring.

18. The process defined in claim 13, wherein the last-mentioned polymerization takes place as a suspension polymerization at a temperature of 30° – 250° C with stirring.

19. A process for the preparation of a thermoplastic resin composition which comprises mixing 0.3 – 30 percent by weight of a graft activating ethylene-vinyl acetate copolymer (B) having in its side chain a $CH_2=C(CH_3)COO-$ group in an amount of 0.04 – 0.25 millimole/gram with component (B) containing 5 – 30 percent of vinyl acetate before graft activation with 99.7 – 70 percent by weight of a copolymerizable vinyl monomeric component (A) having a composition such that the gross total of at least one member selected from the group consisting of (x) an aromatic vinyl compound (y) alkyl methacrylate wherein the alkyl group has one to three carbon atoms and (z) acrylonitrile comprises at least 70 percent by weight of the total weight of the monomeric component and the weight of (y) plus 3.5 times the weight of (z) being in the range of 25 to 150 percent of the total weight of monomer mixture (A) to form a copolymer solution in said monomeric component partially bulk polymerizing said solution at a temperature of 80° – 250°C with stirring in the absence of a radical polymerization initiator unitl phase inversion takes place and thereafter polymerizing the obtained product in such manner that no shearing stress is placed on the rubber component.

* * * * *